(12) United States Patent
Hernandez-Sherrington et al.

(10) Patent No.: US 9,792,351 B2
(45) Date of Patent: Oct. 17, 2017

(54) TOLERANT AND EXTENSIBLE DISCOVERY OF RELATIONSHIPS IN DATA USING STRUCTURAL INFORMATION AND DATA ANALYSIS

(75) Inventors: Mauricio Antonio Hernandez-Sherrington, Gilroy, CA (US); Ching-Tien Ho, San Jose, CA (US); Mary Ann Roth, San Jose, CA (US); Lingling Yan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 577 days.

(21) Appl. No.: 11/149,851

(22) Filed: Jun. 10, 2005

(65) Prior Publication Data
US 2006/0282429 A1 Dec. 14, 2006

(51) Int. Cl.
G06F 7/00 (2006.01)
G06F 17/30 (2006.01)

(52) U.S. Cl.
CPC .............. G06F 17/30604 (2013.01)

(58) Field of Classification Search
None
See application file for complete search history.

(56) References Cited

U.S. PATENT DOCUMENTS

| | | |
|---|---|---|
| 5,210,868 A | 5/1993 | Shimada et al. |
| 5,446,880 A | 8/1995 | Balgeman et al. |
| 5,649,190 A | 7/1997 | Sharif-Askary et al. |
| 5,708,828 A | 1/1998 | Coleman |
| 5,734,887 A | 3/1998 | Kingberg et al. |
| 5,970,490 A | 10/1999 | Morgenstern |
| 6,061,696 A | 5/2000 | Lee et al. |
| 6,088,747 A | 7/2000 | Cotugno et al. |
| 6,189,013 B1 * | 2/2001 | Maslyn et al. ............ 707/104.1 |
| 6,208,992 B1 | 3/2001 | Bruckner |
| 6,397,232 B1 | 5/2002 | Cheng-Hung et al. |

(Continued)

FOREIGN PATENT DOCUMENTS

WO 9960492 11/1999

OTHER PUBLICATIONS

Surajit Chaudhuri, Zhiyuan Chen, Kyuseok Shim, Yuqing Wu; Storing XML (With XSD) in Databases: Interplay of Logical and Physical Designs; 2004, Only One Page.*

(Continued)

*Primary Examiner* — Thu Nga Nguyen
(74) *Attorney, Agent, or Firm* — David W. Victor; Konrad, Raynes, Davda and Victor LLP

(57) ABSTRACT

Various embodiments of a method, system and article of manufacture to discover relationships among a first set of elements and a second set of elements are provided. At least one metric algorithm is identified based on a metric selection parameter. A raw result is determined based on the at least one metric algorithm, a first specified structural description of the first set of elements and a second specified structural description of the second set of elements. The raw result comprises a plurality of relationship measurements and the raw result is ordered. In some embodiments, a balanced result is produced based on the raw result and a matching strategy algorithm. In other embodiments, the matching strategy algorithm is identified based on a matching strategy selection parameter.

34 Claims, 9 Drawing Sheets

(56) References Cited

U.S. PATENT DOCUMENTS

| | | | |
|---|---|---|---|
| 6,539,376 B1* | 3/2003 | Sundaresan et al. | 707/5 |
| 6,567,411 B2 | 5/2003 | Dahlen | |
| 6,728,703 B1* | 4/2004 | Wan et al. | 707/602 |
| 6,792,431 B2 | 9/2004 | Tamboli et al. | |
| 6,848,078 B1 | 1/2005 | Birsan et al. | |
| 6,928,431 B2 | 8/2005 | Dettinger et al. | |
| 6,959,112 B1* | 10/2005 | Wagman | 382/181 |
| 7,155,453 B2* | 12/2006 | Kincaid | 707/104.1 |
| 7,181,450 B2 | 2/2007 | Malloy et al. | |
| 7,337,127 B1* | 2/2008 | Smith et al. | 705/14.66 |
| 7,356,419 B1* | 4/2008 | Culot et al. | 702/22 |
| 7,472,137 B2 | 12/2008 | Edelstein et al. | |
| 7,519,606 B2 | 4/2009 | Hernandez-Sherrington et al. | |
| 2002/0065937 A1* | 5/2002 | Hintermeister et al. | 709/245 |
| 2002/0178192 A1 | 11/2002 | Namioka | |
| 2003/0009296 A1 | 1/2003 | Sabatini et al. | |
| 2003/0037302 A1 | 2/2003 | Dzienis | |
| 2003/0131015 A1* | 7/2003 | Chen | 707/100 |
| 2003/0145020 A1 | 7/2003 | Ngo et al. | |
| 2003/0154194 A1* | 8/2003 | Jonas | 707/3 |
| 2003/0204487 A1 | 10/2003 | Sssv et al. | |
| 2004/0093331 A1* | 5/2004 | Garner et al. | 707/3 |
| 2004/0104943 A1 | 6/2004 | Kamasaki et al. | |
| 2004/0108943 A1 | 6/2004 | Aoyama | |
| 2004/0205045 A1 | 10/2004 | Chen et al. | |
| 2004/0205611 A1 | 10/2004 | Minninger | |
| 2005/0010896 A1 | 1/2005 | Meliksetian et al. | |
| 2005/0080661 A1* | 4/2005 | Casati et al. | 705/10 |

OTHER PUBLICATIONS

A. Boutkottaya, C. Vanoirbeek, F. Paganelli, O. About Khaled, "Automating XML documents Transformations: A conceptual modeling based approach," Proceedings of the first Asian-Pacific conference on Conceptual modelling—vol. 31, Dunedin, New Zealand, Jan. 18-22, 2004 pp. 81-90. [online] Retrieved from the Internet: <URL: http://delivery.acm.org/10.1145/980000/976307/p81-boukottaya.pdf?key1=976307&key2=2524563011&coll=ACM&dl=ACM&CFID=33954776&CFTOKEN=74526249>.

F. Naumann, C.T. Ho, X. Tian, L. Haas and N. Megiddo, "Attribute Classification Using Feature Analysis," the 18th IEEE International Conference on Data Engineering (ICDE), San Jose, California, Feb. 26-Mar. 1, 2002.

Ashraf Aboulnaga, Peter J. Haas, Sam Lightstone, Guy M. Lohman, Volker Markl, Ivan Popivanov and Vijayshankar Raman in "Automated Statistics Collection in DB2 UDB," Proceedings of the 30th VLDB Conference, Toronto, Canada, Aug. 31-Sep. 3, 2004, pp. 1146-1157.

Jayant Madhavan, Philip A. Bernstein and Erhard Rahm, "Generic Schema Matching with Cupid," Proceedings of the 27th VLDB converence, Roma, Italy, 2001, pp. 49-58.

Caregea and T. Syeda-Mahmood in "Semantic API matching for Services Composition," Proceedings of the 13th international World Wide Web conference on Alternate track papers & posters, New York, NY, May 19-21, 2004, pp. 436-437.

Ihab F. Ilyas, Volker Markl, Peter J. Haas, Paul Brown, Ashraf Aboulnaga: in "CORDS: Automatic Discovery of Correlations and Soft Functional Dependencies," SIGMOD Conference 2004, Paris, France, Jun. 13-18, 2004, pp. 647-658.

D. Gale and L. Shapely, in "College admissions and the stability of marriages," The American Mathematical Monthly, vol. 69, pp. 9-15, 1962.

Mauricio A. Hernández, Renée J. Miller, Laura M. Haas, "Clio: A Semi-Automatic Tool for Schema Mapping," ACM/SIGMOD, May 21-24, 2001, Santa Barbara, California, USA.

Matching, [online] Jun. 2, 1997 [retrieved on Jan. 13, 2005] Retrieved from the Internet: <URL: http://www2.toki.or.id/book/AlgDesignManual/BOOK/BOOK4/NODE164.HTM>.

1.7.8 Longest Common Substring [online] Mar. 7, 2001 [retrieved on May 28, 2005] Retrieved from the Internet: <URL: http://www.cs.sunysb.edu/~algorith/files/longest-common-substring.shtml>.

XML Schema Part 0: Primer Second Edition, W3C Recommendation Oct. 28, 2004, [online] Oct. 28, 2004 [retrieved on May 28, 2005] Retrieved from the Internet: <URL: http://www.w3.org/TR/xmlschema-0/>.

XML Path Language (XPath) Version 1.0, W3C Recommendation Nov. 16, 1999 [online] Nov. 16, 1999 [retrieved on May 23, 2005] Retrieved from the Internet: <URL: http://www.w3.org/TR/xpath>.

Felix Naumann, Ching-Tien Ho, Xuqing Tian, Laura Haas, Nimrod Megiddo, "Attribute Classification Using Feature Analysis," IBM Research Report, RJ 10264 (A0211-017), Nov. 5, 2002.

Popkin Software, "Relational Data Modeling", [online], [retrieved on Jun. 3, 2005]. Retrieved from the Internet at <URL: http://government.popkin.com/methods/relational_data_modeling.htm>, 3 pp.

US Ministry of Forests, "Data Modelling Guide—Guide S7", [online], revised Oct. 2003, [Retrieved on Jun. 3, 2005]. Retrieved from the Internet at <URL: http://www.for.gov.bc.ca/his/datadmin/s7.htm>, 58 pp.

Amendment 1, Feb. 2, 2008, for U.S. Appl. No. 11/150,749, Total 19 pp.

Amendment 2, Aug. 25, 2008, for U.S. Appl. No. 11/150,749, Total 12 pp.

Amendment 3, Feb. 25, 2009, for U.S. Appl. No. 11/150,749, Total 20 pp.

Final Office Action 1, Nov. 25, 2008, for U.S. Appl. No. 11/150,749, Total 12 pp.

Notice of Allowability 1, May 13, 2009, for U.S. Appl. No. 11/150,749, Total 11 pp.

Notice of Allowance 1, Jun. 4, 2009, for U.S. Appl. No. 11/150,749, Total 14 pp.

Office Action 1, Nov. 1, 2007, for U.S. Appl. No. 11/150,749, Total 44 pp.

Office Action 2, Apr. 25, 2008, for U.S. Appl. No. 11/150,749, Total 25 pp.

Preliminary Amendment, Nov. 21, 2005, for U.S. Appl. No. 11/150,749, Total 6 pp.

Preliminary Amendment to Correct Erroneously Submitted Preliminary Amendment, Nov. 30, 2005, Total 6 pp.

T. Syeda-Mahmood, Gauri Shah, Lingling Yan, and Willi Urban, "Semantic Search of Schema Repositories" [online] May 10-14, 2005 [retrieved on Nov. 11, 2005] Retrieved from the Internet: <URL: http://www2005.org/cdrom/docs/p1126.pdf>, WWW 2005, May 10-14, 2005. Chiba, Japan. pp. 1126-1127. ACM 1-59593-051-May 5, 2005.

\* cited by examiner

220

| EMP (232) | EMPLOYEE (234) | Semantic name matching measurement (236) | Signature measurement (238) |
|---|---|---|---|
| ENO | EmployeeNumber | 0.14 | 0.6 |
| ENO | PhoneNumber | 0.7 | 0.9 |
| ... | ... | ... | ... |
| FNAME | Name/first | 0.3 | 0.57 |
| FNAME | Name/last | 0.8 | 0.57 |
| ... | ... | ... | ... |
| LNAME | Name/last | 0.2 | 0.57 |
| LNAME | Name/last | 0.2 | 0.57 |
| ... | ... | ... | ... |
| PH_NO | PhoneNumber | 0.1 | 0.1 |
| PH_NO | EmployeeNumber | 0.8 | 0.9 |
| ... | ... | ... | ... |
| EMAIL | emailAddress | 0.2 | 0.1 |
| EMAIL | streetAddress | 0.9 | 0.94 |
| ... | ... | ... | ... |
| PHONE | PhoneNumber | 0.87 | 1 |
| PHONE | emailAddress | 0.9 | 1 |
| ... | ... | ... | ... |
| ADDRESS | emailAddress | 0.68 | 0.90 |
| ADDRESS | streetAddress | 0.68 | 0.39 |
| ... | ... | ... | ... |

FIG. 6

TOLERANT AND EXTENSIBLE DISCOVERY OF RELATIONSHIPS IN DATA USING STRUCTURAL INFORMATION AND DATA ANALYSIS

BACKGROUND OF THE INVENTION 1.0 Field of the Invention

This invention relates to the discovery of relationships in data; and in particular, this invention relates to tolerant and extensible discovery of relationships in data using structural information and data analysis.

2.0 Description of the Related Art

The wide adoption of an Internet-based business model over the past decade has caused an explosion of information. Some estimates suggest that two hundred fifty megabytes of information are generated every year for every living man, woman and child. As a result, the volume and heterogeneity of available data is increasing at a pace that far outpaces our ability to absorb it. In such an environment, the advantage lies with enterprises that can harness this information into a valuable asset to gain a competitive advantage in the marketplace.

This is no easy task. An enterprise typically acquires a multitude of disparate databases, content repositories and file systems as it matures. Because such systems are usually developed independently, these information sources may reside in different locations, be managed by different departments, and even store similar or related data according to different data models and schemas. Often, the high-level objective of a new application is not to start from scratch, but to find, integrate and combine or recycle existing assets into new applications. For example, one such application may be to develop a single view of customer data that may be spread across an enterprise in different databases, departments and locations so as to synchronize that customer's information for various purposes, such as to avoid contacting the same customer multiple times, to propagate changes to a name and address to each system, and to be able to have all information about a customer available when that customer places a service call. Another application may be to locate all of the information sources that reference a particular business concept, such as a purchase order or bill of materials. Yet another application may be to identify independently defined and redundant information assets across an enterprise which has multiple XML (eXtensible Mark-up Language) Schemas, or relational schemas that define customer information, or Web Services Description Language (WSDL) files that describe the same or similar Web Services. Typically an XML Schema exists as a file with an extension of "xsd". An XSD (XML Schema Definition) model is defined using the XML Schema Language. For example, the World Wide Web Consortium (W3C) publishes a description of the XML schema in the "XML Schema Part 0: Primer Second edition, W3C Recommendation 28 Oct. 2004." An XML Schema is also referred to as an XSD model. A WSDL file is a document, written in XML, which specifies the location of the Web service and how to access the Web service.

A significant challenge to building the aforementioned applications is to discover if and how information from multiple data sources may be related. Data is typically stored in multiple sources, such as relational databases, files, applications and queues, and the structure of the data can be described in multiple formats such as relational tables, XSD models, comma separated text files and WSDL files, to name a few. Oftentimes, the structure of the data can be quite complex. An XSD model may have hundreds of XML elements, and a relational table definition may have hundreds of columns. Discovering relationships among information sources may involve multiple levels of analysis such as structural comparison, data comparison and semantic analysis.

In structural comparison, metadata describing the structure of the data in a data source is analyzed. For instance, in a relational database management system, data is stored in tables which have rows and columns; and, in some relational database management systems, a schema contains one or more tables. The database management system contains metadata which specify the names of the tables belonging to a schema in a schema definition. The database management system also contains metadata which describes a table in a table definition. The table definition specifies the names of the columns of the table and the type of data stored in the columns. The similarity of two columns can be determined by comparing the column names and the data type of the columns. The similarity of two tables can be determined based on the similarity of the columns of the tables and a comparison of the table names. The similarity of two schemas can be determined based on the similarity of the tables of the schemas and the similarity of the schema names.

In data comparison, the data contained in the data sources is analyzed. For example, the similarity of various columns can be determined by analyzing the overlap in data values, the distribution of data values and/or the signature of the data values contained in the columns. The signature of the data values refers to the characteristics of the data values in the columns, for example, the position and/or grouping of alphabetic, numerical and special characters within each data value.

In semantic analysis, dictionaries, term expansion rules and other domain-specific knowledge are used to analyze various aspects of metadata. For example, the term "FVT" can be expanded into "functional verification test" based on information in a dictionary.

A number of heuristics and algorithms have been developed over the years to analyze the structural definitions of data as well as instance data, that is, the data contained in a data source. Examples of heuristics and algorithms include structural and semantic name matching, signature algorithms such as described in "Attribute Classification Using Feature Analysis" by F. Naumann, C. T. Ho, X. Tian, L. Haas and N. Megiddo, in the 18th IEEE International Conference on Data Engineering (ICDE), San Jose, Calif., Feb. 26-Mar. 1, 2002, statistical analysis such as described by Ashraf Aboulnaga, Peter J. Haas, Sam Lightstone, Guy M. Lohman, Volker Markl, Ivan Popivanov and Vijayshankar Raman in "Automated Statistics Collection in DB2 UDB" Proceedings of the 30$^{th}$ VLDB Conference, Toronto, Canada, 2004, and others such as described by Jayant Madhavan, Philip A. Bernstein and Erhard Rahm in "Generic Schema Matching with Cupid," Proceedings of the 13$^{th}$ VLDB Conference, Roma, Italy, 2001, pp. 49-58, and by D. Caregea and T. Syeda-Mahmood in "Semantic API matching for Services Composition," Proceedings of the 13$^{th}$ International World Wide Web Conference on Alternate track papers & posters, New York, N.Y., 2004.

Algorithms which run independently on the same sets of metadata can reinforce one another's results. For example, suppose that a structural matching algorithm suggests a relationship between a column named "creditClass" on one source and a column named "creditRating" on another source. A second algorithm that performs statistical analysis on the data in the columns may find that the columns contain the same values; therefore, also suggesting a relationship between the columns.

Conversely, the results of one algorithm may invalidate the results of another algorithm. For example, suppose that a name matching algorithm indicates that a column named "SSN" of a first table is a match to a column named "SSN" of a second table. This algorithm indicates that the columns are the same, and may also make the additional inference that both columns contain social security numbers. However, another algorithm which analyzes the signature of the data in the columns may find that the format of the data in the column in the first table is NNN-NN-NNNN, while the format of the data in the column in the second table is AANNNNN. Thus, the signature of the data indicates that the columns probably do not represent the same data.

Since algorithms that perform discovery are developed independently and for different purposes, combining their execution and their results is a difficult task. Each algorithm typically requires a structural description of the data using its own model, such as relational tables, the XSD model or a comma-separated text file, and may only analyze data of a specific format. In addition, each algorithm typically computes its own measurement which indicates the strength of a relationship among metadata. For example, in some algorithms a measurement may have a value between zero and one, while in another algorithm a measurement may have a value between zero and one hundred. In addition, a value of zero may indicate a strong relationship; and, alternately a value of zero may indicate a weak relationship.

Therefore, there is a need for an improved technique that allows multiple algorithms to be used to discover relationships in metadata. The technique should also be extensible, allow additional algorithms to be incorporated, and allow the results of the algorithms to be combined. In addition, the technique should allow relationships to be discovered over disparate sources having multiple data formats. The technique should also provide for data sampling access across distributed, heterogeneous sources.

SUMMARY OF THE INVENTION

To overcome the limitations in the prior art described above, and to overcome other limitations that will become apparent upon reading and understanding the present specification, various embodiments of a method, system and article of manufacture are provided to discover relationships among a first set of elements and a second set of elements. At least one metric algorithm is identified based on a metric selection parameter. A raw result is determined based on the at least one metric algorithm, a first specified structural description of the first set of elements and a second specified structural description of the second set of elements. The raw result comprises a plurality of relationship measurements and the raw result is ordered. In some embodiments, a balanced result is produced based on the raw result and a matching strategy algorithm. In other embodiments, the matching strategy algorithm is identified based on a matching strategy selection parameter.

In various embodiments, at least one metric algorithm uses sample data, and sample data is retrieved based on sample data connection information. In some embodiments, the first and second structural descriptions have a native format, and the first and second structural descriptions are translated to a common format if the native format is different from the common format.

In some embodiments, a computer system discovers relationships between a first set of elements and a second set of elements. A discovery engine receives parameters comprising at least one and any combination of: first and second structural descriptions of the first and second sets of elements, respectively, and a metric selection parameter. A metric component provides a raw result. The metric component is associated with a plurality of metric algorithms. Each metric algorithm determines one or more measurements based on the first and second structural descriptions. The raw result is based on at least one selected metric algorithm of the plurality of metric algorithms. The at least one selected metric algorithm is selected from the plurality of metric algorithms based on the metric selection parameter.

In other embodiments, in the computer system, the parameters further comprise at least one or any combination of sample data connection information and a matching strategy selection. The computer system further comprises at least one or any combination of: a model manager, associated with one or more transformers, each transformer to translate the first structural description and the second structural description from a native format to a common format; a sample manager, associated with one or more sample modules, each sample module to provide sample data using based on the sample data collection information in response to the one at least one selected metric algorithm using sample data; and a matching component, associated with one or more matching strategy algorithms, each matching strategy algorithm to determine a balanced result based on the raw result and a selected matching strategy algorithm that has been selected based on the matching strategy selection.

In this way, an improved technique which allows multiple algorithms to be used to discover relationships in metadata is provided

BRIEF DESCRIPTION OF THE DRAWINGS

The teachings of the present invention can be readily understood by considering the following description in conjunction with the accompanying drawings, in which:

FIG. 6 depicts an exemplary raw result produced by the example of FIG. 5;

To facilitate understanding, identical reference numerals have been used, where possible, to designate identical elements that are common to some of the figures.

DETAILED DESCRIPTION

Figure 1:
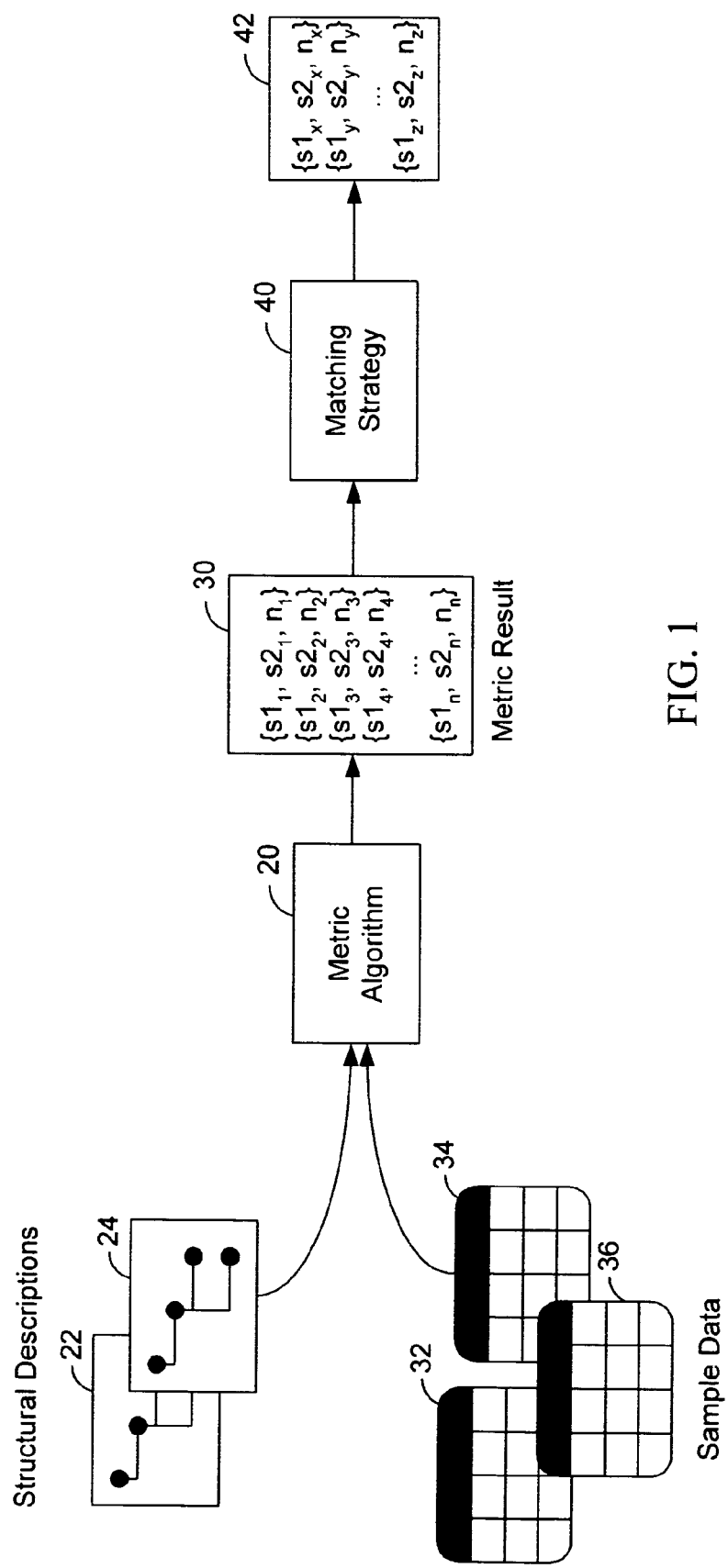
FIG. 1 depicts a block diagram illustrating an embodiment of the discovery process.

After considering the following description, those skilled in the art will clearly realize that the teachings of the various embodiments of the present invention can be utilized to discover relationships between metadata. The metadata may be obtained from different data sources and may have different formats. Various embodiments of a method, system and article of manufacture discover relationships among a first set of elements and a second set of elements. At least one metric algorithm is identified based on a metric selection parameter. A raw result is determined based on the at least one metric algorithm, a first specified structural description of the first set of elements and a second specified structural description of the second set of elements. The raw result comprises a plurality of relationship measurements and the raw result is ordered. In some embodiments, a balanced result is produced based on the raw result and a matching strategy algorithm. In other embodiments, the matching strategy algorithm is identified based on a matching strategy selection parameter.

Structural and semantic name matching algorithms, signature algorithms, statistical and analysis algorithms can be used in isolation to discover relationships between metadata from different sources. The present inventors realized that there is even greater value when various algorithms are used together because each algorithm uses a unique set of assumptions, strategy, and measurement to suggest a relationship. For example, when the results of multiple algorithms indicate a relationship in which metadata is considered to be the same, the algorithms reinforce each other. When the results of multiple algorithms contradict each other as to a relationship among metadata, misleading results may be reduced.

A set comprises one or more elements. In various embodiments, an element is metadata which describes the data contained in a data source. Relationship discovery is a process by which a user can discover explicit and/or implicit relationships among the elements of different sets. The sets of elements are typically from different sources; and, in some embodiments, the sets of elements are from the same source.

In various embodiments, a technique provides a tolerant, heterogeneous, extensible framework which enables relationship discovery over distributed, heterogeneous sources of data. Tolerant means that the framework uses structural and, in some embodiments, instance-level information, that is, sample data, to suggest possible relationships between the elements of the different sets. Typically, the quality of the suggested relationships improves as the amount of information used to determine the relationships increases. Heterogeneous means that the algorithms can be used over sets from different data sources which have different data formats, such as relational and XML data sources. In some embodiments, non-relational data sources may also be used. Extensible means that new metric algorithms and, in some embodiments, new matching strategy algorithms, can be added. In various embodiments, extensible also means that new data formats, and in some embodiments, additional data sources for sampling, can be added.

In some embodiments, the framework can be used with multiple data models, that is, formats, including, and not limited to, the XSD model and relational data models. In various embodiments, the framework also provides for data sampling access across distributed, heterogeneous sources. In some embodiments, the framework can incorporate an extensible set of metric algorithms to measure the strength of the relationship between various elements and combine their results to provide a combined relationship measurement.

A number of algorithms are available which enable customized types of discovery. These algorithms can typically be grouped into two classes: metric algorithms and matching strategy algorithms. A metric algorithm is a technique which computes a measurement representing the quality or strength of a relationship between sets of source elements. For example, elements may be column names, and a set of source elements may comprise the column names defined for a table of a schema of a database. In another example, the elements may be table names, and the set of source elements may comprise the table names of a schema of the database. Each set of source elements has a structural description which describes the structure of the elements of the set of elements in a particular format. This format is also referred to as the data model, for example, the XSD data model, and the relational data model. The relational data model describes a set of elements using one or more tables of the database management system. An exemplary table definition for a table named EMP which uses the relational data model is shown below in Table 1. The left column contains a column name and the right column contains the data type of the column.

TABLE 1

Exemplary table definition of a table named EMP

| ENO | Int |
|---|---|
| FNAME | Char (12) |
| LNAME | Char (16) |
| PH_NO | Char (10) |
| EMAIL | Char (20) |
| PHONE | Char (10) |
| ADDRESS | Char (30) |

In various embodiments, the XSD data model describes the structure of the set of elements. An exemplary XSD model is shown below of a table named "EMPLOYEE":

```
<element name="EMPLOYEE" maxOccurs="unbounded">
    <complexType>
        <sequence>
            <element name="EmployeeNumber" type="integer"/>
            <element name="Name">
                <complexType>
                    <sequence>
                        <element name="first" type="string"/>
                        <element name="last" type="string"/>
                    </sequence>
                </complexType>
            </element>
            <element name="PhoneNumber" type="string"/>
            <element name="emailAddress" type="string"/>
            <element name="streetAddress" type="string"/>
        </sequence>
    </complexType>
</element>
```

FIG. 1 depicts a block diagram illustrating an embodiment of the discovery process. In FIG. 1, structural descriptions, 22 and 24, of a first set of elements and a second set of elements, respectively, use the same data model. A metric algorithm 20 receives the structural descriptions, 22 and 24, and produces a metric result 30 of one or more tuples $\{s1_i, s2_i, n_i\}$, which indicate the strength of the relationship between the elements of the different sets. In FIG. 1, the tuples are triplets. In the metric result 30, for an $i^{th}$ tuple, $s1_i$ represents an element from the first sets, $s2_i$ represents an element from the second set and $n_i$ is a value, that is, a measurement, representing the strength of the relationship between the elements of the first and second sets, $s1_i$ and $s2_j$.

In various embodiments, the strength of the relationship between the elements represents a difference or distance between various elements in the first and second sets. In other embodiments, the strength of the relationship represents a similarity between the elements in the first and second sets. Various embodiments of the invention will be described with respect to measurements which represent distances; however, other embodiments of the invention can use measurements which represent similarity. In some embodiments, the metric algorithm 20 also uses sample data 32, 34 and 36, from the first and second data sources to determine the strength of the relationship between the elements of the different sets.

A matching strategy algorithm 40 receives the metric result 30 and determines a subset 42 of tuples of the metric result 30 which represent optimal matches in accordance with some criteria. For example, one matching strategy algorithm determines the subset 42 of optimal matches using the well-known Hungarian "stable marriage" algorithm. Such a stable marriage algorithm has been described by D. Gale and L. Shapely, in "College admissions and the stability of marriages," The American Mathematical Monthly, Volume 69, pages 9-15, 1962.

Figure 2:
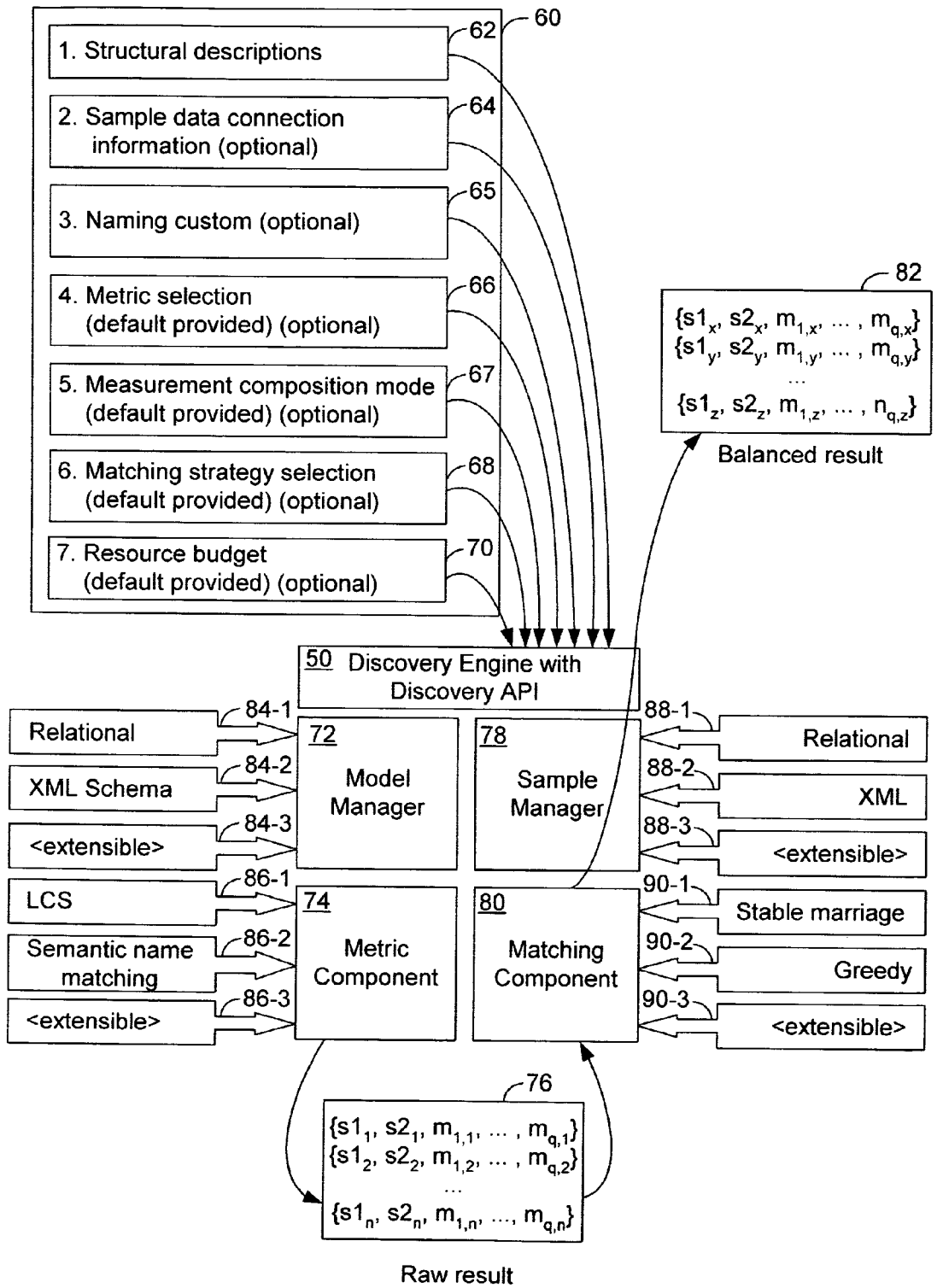
FIG. 2 depicts a block diagram of an embodiment of a framework for performing discovery.

FIG. 2 depicts a block diagram of an embodiment of a framework for performing discovery. A discovery engine 50 receives various inputs or parameters 60 in accordance with a discovery application programming interface (API). In various embodiments, the parameters 60 comprise structural descriptions 62 of the sets of elements, and at least one or any combination of: sample data connection information 64, a naming custom 65, a metric selection 66, a measurement composition mode 67, a matching strategy selection 68 and a resource budget 70. The sample data connection information 64, naming custom 65, metric selection 66, measurement composition mode 67, matching strategy selection 68 and resource budget 70 are optional parameters. If not specified, defaults are provided for the metric selection 66, measurement composition mode 67, matching strategy selection 68 and resource budget 70. In various embodiments, a user specifies the parameters 60 using a graphical user interface. In some embodiments, one or more of the parameters 60 are passed to the discovery engine 50 in response to invoking the discovery engine 50 to perform a discovery. In various embodiments, one or more of the parameters 60 are stored in memory using the discovery API and the discovery engine 50 retrieves those parameters from memory.

The structural descriptions 62 comprise first and second structural descriptions of first and second sets of elements, respectively. The structural descriptions 62 describe the sets of elements in their native format. The native format is typically the format used by the data source containing the elements. In various embodiments, the native format is a relational database format such as a SQL data model. In other embodiments, the native format is the XSD model. However, the native format is not meant to be limited to a relational database format and XSD model and other formats may be used.

In some embodiments, the sample data connection information 64 comprises information to access data sources. For example, the sample data connection information 64 may comprise a user identifier (id) and password, and/or a Uniform Resource Identifier (URI). In some embodiments, the sample data connection information also comprises a preferred sampling size and rate. The sample data connection information 64 is an optional parameter and is specified if data sampling is to be used by any of the metric algorithms which are specified by the user.

Within an enterprise, various organizations may adopt different naming customs or conventions in their databases. In various embodiments, a naming custom parameter 65 which is associated with a structural description is supplied, and the metric algorithm(s) adjusts the elements of a structural description which are being compared in accordance with the naming custom parameter. The naming custom parameter 65 comprises a mapping and an identifier of the structural description to which the mapping is to be applied. Typically the mapping is an array which associates a specified sequence with a mapping sequence. Table 2 illustrates an exemplary mapping of a naming custom as follows:

TABLE 2

Exemplary Naming custom

| Sequence | Mapping Sequence |
|---|---|
| CSR | Customer |
| CUST | Customer |

When the metric algorithm encounters a specified sequence in an element in the structural description specified by the naming custom parameter 65, and prior to determining the strength of the relationship of that element to another element, the metric algorithm replaces the specified sequence with its associated mapping sequence to provide an adjusted element. For example, assume that the metric algorithm encounters an element named "CUSTID", the metric algorithm replaces "CUST" with "Customer" to provide an adjusted element of "CustomerID", and determines the strength of the relationship between "CustomerID" and the elements of the other structural description being compared. In some alternate embodiments, the naming custom parameter 65 is omitted.

The metric selection 66 provides a user preference for one or more metric algorithms. If no explicit metric algorithms are specified via the metric selection 66, one or more default metric algorithms will be used as the metric selection. A metric algorithm typically produces at least one measurement; however, in some embodiments, a metric algorithm returns no measurements if there are no matches.

Generally, a measurement expresses the strength of a relationship between two elements, and is a value from any domain with a complete ordering. A measurement has a well-defined meaning when compared against another measurement.

In some embodiments, various types of measurements are supported such as numeric measurements and composite measurements. A numeric measurement is a numeric value which can be compared. For example, a value of 0.4 is less than a value of 0.56. The composite measurement is a vector of relationship measurements, such as $<m_1, m_2, m_3>$, where each value of $m_i$ is a numeric measurement or another composite measurement.

The measurement composition mode 67 provides a user preference for combining and ordering measurements from a plurality of metric algorithms. The measurement composition mode 67 specifies whether the measurements from a plurality of metric algorithms will be combined into a single measurement or whether the measurements will be ordered to form a composite measurement. In response to the measurement composition mode 67 specifying "compose by weight", the measurements will be combined into a single measurement, the user may also specify weights for combining the measurements. If no weights are specified, default weights will be used. In some embodiments, the default weights have the same value and the sum of the default weights is equal to one. For example, for measurements $m_1$, $m_2$, . . . , $m_n$ and weights $w_1$, $w_2$, . . . $w_n$, the weighted measurement is equal to $m_1w_{1+}$ $m_2w_{2+}$ . . . $+m_nw_n$ and $w_1+w_2+$ . . . $+w_n=1$. If the specified measurement composition mode 67 specifies "compose by order", then the ordering of the measurements of the metric algorithms within the tuples may also be specified. For example, if the ordering of the metric algorithm specifies that the measurement of the semantic name matching algorithm ($s_{snm}$) is followed by the measurement of the signature algorithm ($m_{sig}$), then the measurements $m_{snm}$ and $m_{sig}$ are ordered within each tuple as follows:

$$<s1_i, s2_i, m_{snm,i}\ m_{sig,i}>.$$

The matching strategy selection 68 provides a user preference for a matching strategy algorithm. If no explicit matching strategy selection 68 is supplied, the discovery engine 50 will use a default matching strategy algorithm. In some embodiments, the matching strategy selection 68 is omitted.

The resource budget 70 represents an amount of time to perform discovery. If no resource budget 70 is explicitly specified, a default value for the resource budget is used. Metric and matching strategy algorithms could execute for long periods of time if the structural source descriptions have large or complex structures or large amounts of data. In various embodiments, the resource budget 70 is specified using a gauge, such as "low," "medium," or "high," and is used by the discovery engine 50 to determine which metric algorithm(s) and, in some embodiments, which matching strategy algorithm, in order to regulate the amount of time used for discovery. In some embodiments, the resource budget 70 is omitted.

The model manager 72 receives the first and second structural descriptions 62 from the discovery engine 50 and translates the structural descriptions 62 from their native format to a common format if the native format is different from the common format. In some embodiments, the common format is the XSD model. However, the common format is not meant to be limited to the XSD model and other formats may be used.

The discovery engine 50 identifies one or more metric algorithms based on the metric selection 66 and, in some embodiments, the resource budget 70 to provide one or more identified metric algorithms. A metric component 74 performs the one or more identified metric algorithms on the structural descriptions 62 and, in some embodiments, using sample data. Each identified metric algorithm receives the first and second structural descriptions of the first and second sets in the common format and produces a result which comprises relationship measurements between the elements of the structural descriptions. The metric component 74 produces a first result 76 which comprises one or more tuples $\{s1_i, s2_i, n_{1,i}, . . . , n_{m,i}\}$ where $s1_i$ and $s2_i$ represent elements from different sets, and $n_{1,i}, . . . , n_{m,i}$ are the relationship measurements of elements $s1_i$ and $s2_i$ determined by each of m identified metric algorithms.

The discovery API 50 also comprises one or more sample APIs which are used by a metrics algorithm of the metric component 74 to retrieve the sample data. The sample manager 78 processes the sample APIs. The sample data is from the data sources associated with the sets of elements.

The metric component 74 processes the relationship measurements of the first result in accordance with the measurement composition mode 67 to provide a second result, and then sorts the tuples of the second result to provide the raw result 76. The raw result 76 comprises one or more tuples $\{s1_i, s2_i, m_{1,i}, . . . , m_{q,i}\}$, in which, in some embodiments, m represents a single measurement or a weighted value of one or more measurements of the first result, and in which in other embodiments, m represents a single measurement which is in a position in accordance with the specified, or default, ordering. In an alternate embodiment, the measurement composition mode 67 is not used.

The matching component 80 produces a balanced result 80 which is a subset of the raw result 76 based on a matching strategy algorithm which was identified in accordance with the matching strategy selection 68, and in some embodiments, the resource budget 70.

In some embodiments, the framework is implemented using the Eclipse platform. The Eclipse platform provides its own APIs for discovering, integrating and executing plug-ins. In the Eclipse platform, the plug-ins are coded in the Java® (Registered trademark of Sun Microsystems, Inc.) programming language. Each plug-in has a manifest file declaring its interconnections to other plug-ins. The Eclipse platform comprises software methods to manage the plug-ins, such as a software method to identify the various plug-ins associated with the model manager, metric component, sample manager and matching component, and a software method to load a plug-in for execution. However, the framework is not meant to be limited to the Eclipse platform and other platforms and programming languages may be used.

In various embodiments, the discovery API defines various interfaces. The discovery API defines an interface by which transformers that translate sets of elements in their native formats to the common format can be provided, an interface by which data samples can be provided for metric algorithms, an interface by which metric algorithms can be provided, specified and invoked and an interface by which matching strategy algorithms can be provided, specified and invoked. Additional algorithms can be added to the framework using the appropriate interface.

The model manager 72 maps elements in the native data format to the common format, and vice versa. Support for specific data formats is encapsulated in transformers 84, which are individual plug-ins into the model manager 72, via extension points, as shown in FIG. 2. The model manager 72 is configured with one or more transformers 84. A transformer 84 translates from a particular native format to the common format, and vice versa. For example, in FIG. 2, one transformer 84-1 translates a structural description in a relational format to the common format, and another transformer 84-2 allows a structural description in the XSD model to be used without transformation since it has already been identified to be in the common format. Additional transformers 84-3 can be added to the model manager 72 using extension points. For example, the following defines an extension point, named "Transformer," which is used to add transformers:

```
<extension-point
    id="com.ibm.datatools.metadata.discovery.Transformer"
    name="Transformer"/>
```

In an embodiment using the Eclipse platform, the XML element above is added to a manifest file called plug-in.xml.

The discovery engine has access to extensions associated with an extension point. Each extension has a declaration in its own manifest file to attach to an extension point. The following illustrates an example of a declaration which adds a transformer, named "Relational Transformer," as an extension to the extension point named "Transformer" which was defined above:

```
<extension
    point ="com.ibm.datatools.metadata.discovery.Transformer"
    name ="Relational Transformer"
    class="com.ibm.datatools.metadata.discovery.modelManager.-
    RelationalTransformer"
    id="com.ibm.datatools.metadata.discovery.modelManager.-
    RelationalTransformer"/>
```

The XML Path language (XPath) is a language for addressing parts of an XML document, and is described in XML Path Language (XPath) Version 1.0, W3C Recommendation 16 Nov. 1999. In various embodiments, the transformer 84 also maps expressions in the native data format to an equivalent XPath expression. For example, the relational transformer 84-1 translates a relational model object, such as column "column1" of table "table1" of schema "schema1" of database "myDB", which is identified as "myDB.schema1.table1.column1", into an equivalent XPath expression which is represented as "myDB/schema1/table1/column1". In some embodiments, the metric algorithm represents the elements internally as XPath expressions.

The metric component 74 manages the identified metric algorithms to be applied as part of the discovery process. The metric component 74 is configured with one or more metric algorithms 86. Individual metric algorithms 86 are encapsulated as plug-ins to the metric component 74. The metric selection parameter 66 specifies a user preference as to which metric algorithms to perform. For example, as shown in FIG. 2, a Longest Common Substring (LCS) algorithm 86-1 and a semantic name matching algorithm 86-2 are provided. The metric component 74 can be configured with additional metric algorithms 86-3 as plug-ins using an extension point. For example, the following defines an extension point, named "DistanceMetric," which is used to add metric algorithms:

```
<extension-point
    id="com.ibm.datatools.metadata.discovery.Distancemetric"
    name="DistanceMetric"/>
```

In an embodiment using the Eclipse platform, the XML element above is added to the manifest file called plug-in.xml.

Each extension has a declaration in its own manifest file to attach to an extension point. The following illustrates an example of a declaration which adds a metric algorithm to the extension point named "DistanceMetric" defined above:

```
<extension
    point ="com.ibm.datatools.metadata.discovery.Distancemetric"
    name ="Pattern Matching Metric"
    class="com.ibm.datatools.metadata.discovery.distanceMetrics.-
    PatternMatcher"
    id="com.ibm.datatools.metadata.discovery.distanceMetrics.-
    PatternMatcher"/>
```

The sample manager 78 provides data samples using the sample data connection information 64. Exemplary metric algorithms which use sample data to determine the strength of a relationship between metadata elements comprise signature and XRAM algorithms. The XRAM algorithm is described by Ihab F. Ilyas, Volker Markl, Peter J. Haas, Paul Brown, Ashraf Aboulnaga: in "CORDS: Automatic Discovery of Correlations and Soft Functional Dependencies," SIGMOD Conference 2004: pp. 647-658. The sample manager 78 can be configured to access a variety of data sources, for example, relational databases, Excel spreadsheets, Open Database Connectivity (ODBC) sources and XML documents. Source specific logic is encapsulated in a sample module 88 which is an individual plug-in to the sample manager 78 using an extension point. In addition, metric algorithms typically work with data expressed in terms of the common format, for example, the XSD model in which individual elements are referenced using an XPATH expression. An exemplary XPATH expression is "/mySchema/myTable/column1". However, the source data is expressed in the native format and elements are referenced using a native expression, for example, in a relational model "mySchema.myTable.column1." Thus, in some embodiments, the sample manager 78 invokes the model manager 72 to convert a sample identifier from an expression using the common format, for example, the XPATH expression "/mySchema/myTable/column1", to an expression using the native format, for example, the relational expression "mySchema.myTable.column1." For example, as shown in FIG. 2, the sample manager 78 is configured with sample modules which allow data to be accessed from a relational source 88-1 and an XML source 88-2. Additional sample modules 88-3 can be added to the sample manager 78 to access data in other formats and from other sources using the extension point. For example, the following defines an extension point, named "SampleModule," which is used to add sample modules:

```
<extension-point
    id="com.ibm.datatools.metadata.discovery.Samplemodule"
    name="SampleModule"/>
```

In an embodiment using the Eclipse platform, the XML element above is added to the manifest file called plug-in.xml.

Each extension has a declaration in its own manifest file to attach to an extension point. The following illustrates an example of a declaration which adds a sample module which gathers samples from an IBM® (Registered trademark of International Business Machines Corporation) DB2® (Registered trademark of International Business Machines Corporation) database, as an extension to the extension point named "SampleModule" defined above:

```
<extension
    point ="com.ibm.datatools.metadata.discovery.Samplemodule"
    name ="DB2 Sample Module"
    class="com.ibm.datatools.metadata.discovery.sampleManager.-
    DB2SampleModule"
    id="com.ibm.datatools.metadata.discovery.sampleManager.-
    DB2SampleModule"/>
```

The matching component 80 is configured with one or more matching strategy plug-ins 90 which provide one or more matching strategy algorithms, respectively. For example, in FIG. 2, first and second matching strategy plug-ins, 90-1 and 90-2, provide a stable marriage algorithm and a greedy algorithm, respectively. The matching strategy algorithms are added as plug-ins 90-1, 90-2 and 90-3 to the matching component 80 via an extension point. The following defines an extension point, named "MatchingAlgorithm," which is used to add matching strategy algorithms:

```
<extension-point
    id="com.ibm.datatools.metadata.discovery.matchingAlgorithm"
    name="MatchingAlgorithm"/>
```

In some embodiments, the definition of the extension point above is added to the manifest file called plug-in.xml.

The following illustrates an example of a declaration which adds a matching strategy algorithm to the extension point named "MatchingAlgorithm" defined above:

```
<extension
    point ="com.ibm.datatools.metadata.discovery.matchingAlgorithm"
    name ="Hungarian Stable Marriage"
    class="com.ibm.datatools.metadata.discovery.matchingStrategy.-
    Hungarian"
    id="com.ibm.datatools.metadata.discovery. matchingStrategy.-
    Hungarian"/>
```

In an alternate embodiment, the model manager 72, metric component 74, sample manager 78 and matching component 80 comprise a registry of their associated plug-ins, and implement additional functionality to manage the plug-ins such as providing a list of the names, or other identification, of the various plug-ins and loading the individual plug-ins for execution. In various embodiments, the registry comprises information about plug-ins such as the name of the plug-in and location of the plug-in. The model manager has a transformer registry, and when a transformer plug-in is added, information about that transformer is added to the transformer registry. The metric component has a metric algorithm registry, and when a metric algorithm plug-in is added, information about that metric algorithm is added to the metric algorithm registry. The sample manager has a sample module registry, and when a sample module plug-in is added, information about that sample module is added to the sample module registry. The matching component has a matching strategy algorithm registry, and when a matching strategy algorithm plug-in is added, information about that matching strategy algorithm is added to the matching strategy algorithm registry. In some embodiments, the model manager, metric component, sample manager and matching component provide a software method or function, to list all the plug-ins that have been registered with the model manager, metric component, sample manager and matching component, respectively. In some embodiments, the model manager, metric component, sample manager and matching component provide a software method or function, to load an identified transformer plug-in, metric algorithm plug-in, sample module plug-in and matching strategy algorithm plug-in, respectively, for execution.

The plug-ins of the model manager 72, sample manager 78, metric component 74 and matching component 80 are orthogonal, and individual plug-ins of the model manager 72, sample manager 78, metric component 74 and matching component 80 can operate independently on the same or different sets of elements. Thus, the plug-ins of the model manager, sample manager, metric component and matching component can be combined in various ways to discover relationships between sets of elements. For example, a first plug-in of the metric component may implement a signature algorithm, and a second plug-in of the metric component may implement a semantic name matching algorithm. In another example, a first plug-in of the matching component may implement a greedy algorithm as the matching strategy, and a second plug-in of the matching component may implement a stable marriage algorithm as the matching strategy. In yet another example, the plug-in of the metric component implementing the signature algorithm can be combined with the plug-in of the matching component implementing the stable marriage matching strategy and invoked over sets of relational table column names. In another example, a combination of plug-ins implementing a semantic name matching algorithm and the stable marriage algorithm is invoked over the same or different sets of relational table column names.

Using the discovery API, end users can invoke various algorithms, and combinations of algorithms, over heterogeneous data sources by specifying parameters 60. In various embodiments, the discovery engine 50 selects the metric algorithms to invoke from the metric algorithms associated with the metric component 74 based on the metric selection 66, and, in some embodiments, at least one or any combination of a default metric algorithm(s), and resource budget parameter 70.

The discovery engine 50 and discovery API provide an extensible technique to combine different transformers, metric algorithms, sample modules and matching strategy algorithms under a single execution over multiple sets with heterogeneous data formats and access methods, and provide an integrated result which can be used to analyze the combined effect of the algorithms.

Figure 3:
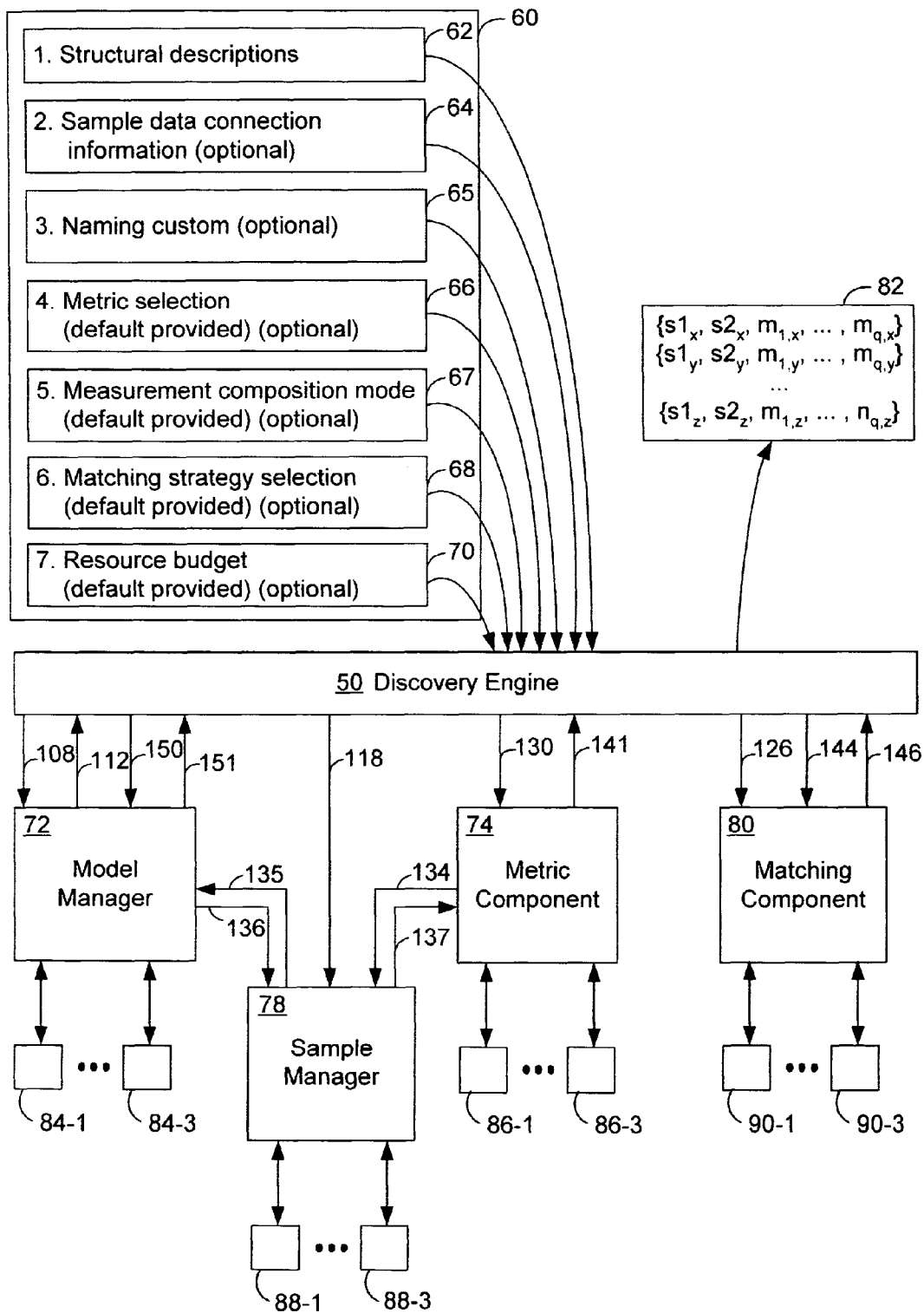
FIG. 3 depicts a block diagram of an embodiment illustrating various relationships between the components of the framework of FIG. 2.

FIG. 3 depicts an embodiment illustrating various relationships between the components of the framework of FIG. 2. The parameters 60 of FIG. 2 are shown. The parameters comprise the structural descriptions 62, and at least one or any combination of sample data connection information 64, the naming custom 65, the metric selection 66, the measurement composition mode 67, the matching strategy selection 68 and the resource budget 70. The framework comprises the discovery engine 50, model manager 72 and associated transformers 84-1 to 84-3, the sample manager 78 and associated sample modules 88-1 to 88-3, the metric component 74 and associated metric algorithms 86-1 to 86-3, and the matching component 80 and associated matching strategy algorithms 90-1 to 90-3.

Figures 4, 4A:
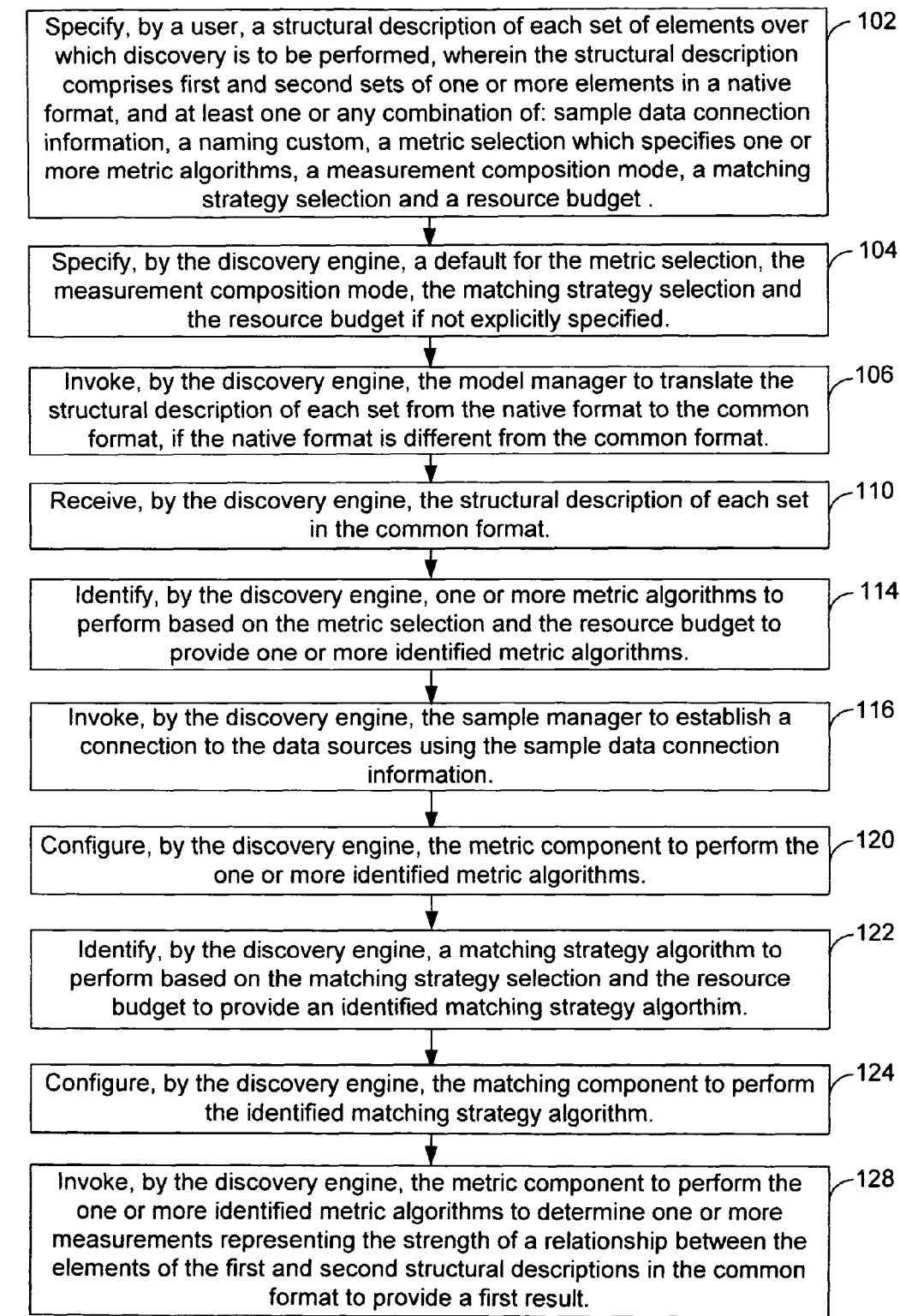
FIG. 4 comprises FIGS. 4A and 4B which collectively depict a flowchart of an embodiment of a discovery technique.
Figure 4B:
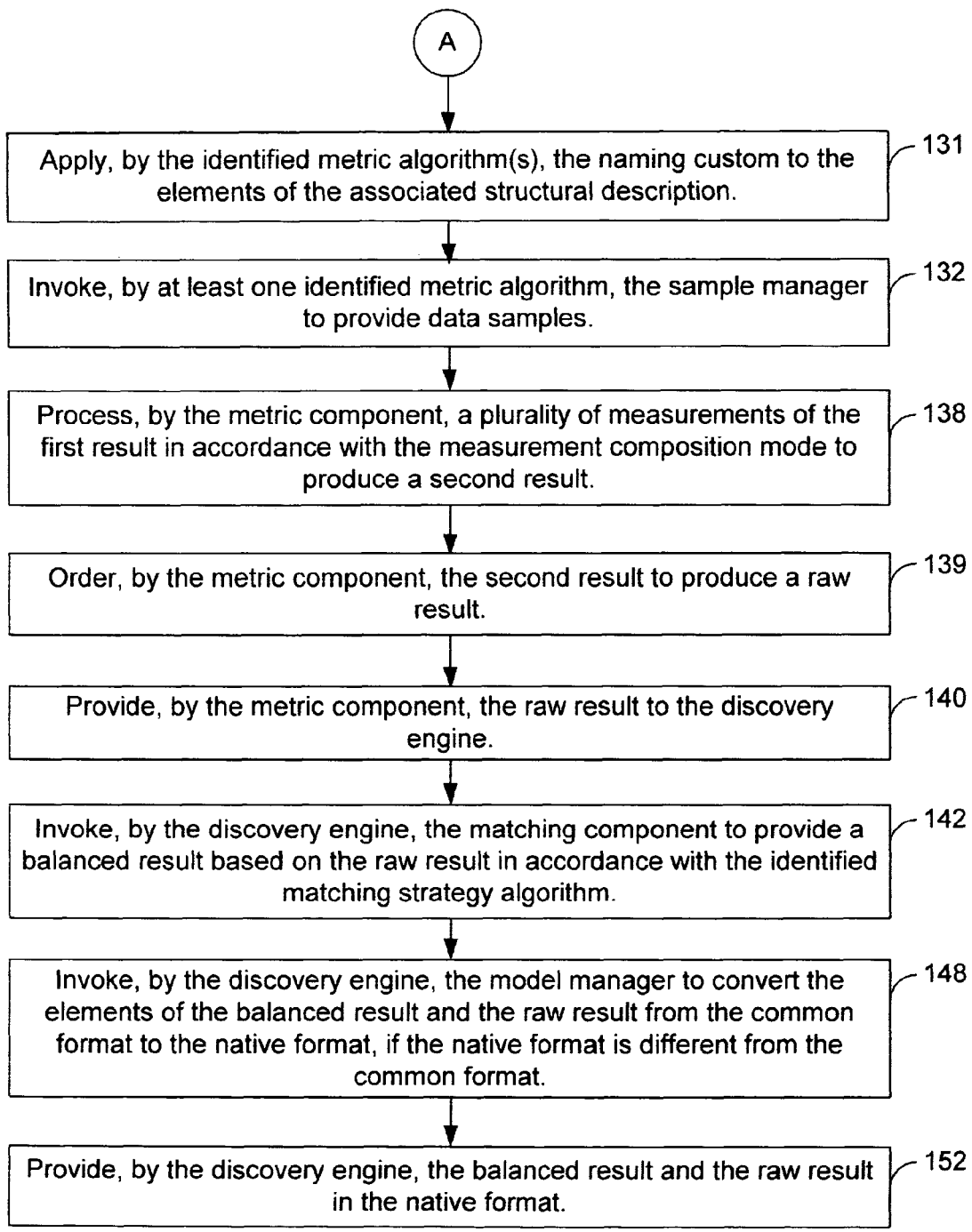

FIG. 4 comprises FIGS. 4A and 4B which collectively depict a flowchart of an embodiment of a discovery technique. The flowchart of FIG. 4 will be described with reference to FIG. 3.

Referring to FIG. 3 and FIG. 4A, in step 102, a user specifies various parameters 60 comprising the structural description 62 of each set of elements over which discovery is to be performed, and at least one or any combination of: sample data connection information 64, the naming custom 65, the metric selection 66 of one or more metric algorithms, the measurement composition mode 67, the matching strategy selection 68 and the resource budget 70. The structural description 62 comprises first and second sets of one or more elements in a native format. The naming custom parameter 65 also specifies an associated structural description to which the naming custom will be applied. The discovery engine 50 receives the parameters 60 via the discovery API. In some embodiments, the structural description 62 of each set of elements over which discovery is to be performed, and no other parameters, are specified.

In step 104, the discovery engine specifies a default for the metric selection 66, the measurement composition mode 67, the matching strategy selection 68 and the resource budget 70 if not explicitly specified.

In step 106, the discovery engine 50 invokes (arrow 108) the model manager 72 to translate the structural description of each set from the native format to a common format, if the native format is different from the common format. The model manager 72 invokes the appropriate transformer 84 to translate a structural description.

In step 110, the discovery engine 50 receives the structural description of each set in the common format as indicated by arrow 112.

In step 114, the discovery engine 50 identifies one or more metric algorithms to perform based on the metric selection 66 and the resource budget 70 to provide one or more identified metric algorithms which will be executed. In various embodiments, the discovery engine 50 balances the metric algorithms specified by the metric selection 66 against a number of factors to determine which metric algorithms will be executed. In some embodiments, the following factors are balanced: (1) explicit metric algorithm selection provided by the user in the metric selection 66; (2) resource budget 70 specified by the user; (3) information published by individual metric algorithms, such as whether sample data is used by the metric algorithm; and (4) the availability of sample data.

In various embodiments, when the resource budget is "low," a first predefined metric algorithm, for example, the basic Longest Common Substring (LCS) algorithm, is used as the identified metric algorithm. When the resource budget is "medium," a second predefined metric algorithm, which typically runs for a longer amount of time than the first predefined algorithm, is used as the identified metric algorithm. For example, the second predefined metric algorithm is the semantic name matching algorithm using a thesaurus. In response to the resource budget being equal to "high" and a user specifying one or more metric algorithms in the metric selection 66, the metric algorithm(s) of the metric selection 66 are used as the identified metric algorithm(s). In response to the resource budget being equal to "high" and the user not specifying any metric algorithms in the metric selection 66, one or more default metric algorithms of the metric selection are used as the identified metric algorithm(s). In other embodiments, different metric algorithms other than basic longest common substring and semantic name matching are used as the first and second predefined metric algorithms in response to the resource budget 70 being "low" or is "medium," respectively. In another embodiment, if a metric algorithm specified by the metric selection 66 uses sample data and the sample data is not available, that metric algorithm is not determined to be an identified metric algorithm. In yet another embodiment, if the resource budget 70 is "low", or alternately, "medium," and the metric algorithm specified by the metric selection 66 uses sample data, that metric algorithm is not determined to be an identified metric algorithm. In an alternate embodiment, the resource budget 70 is not used.

In step 116, the discovery engine 50 invokes the sample manager 78 to establish a connection to the data sources using the sample data connection information 70 as indicated by arrow 118. The discovery engine 50 invokes the sample manager 78 to identify which sample module(s) will be used. For example, the sample manager 78 uses login and password information of the sample data connection information 64 to log on to a data source using the appropriate sample module. In another example, the sample manager 78 uses a URL which was specified in the sample data connection information 64 to access another data source. In embodiments in which a metric algorithm does not use sample data, step 116 is omitted.

In step 120, the discovery engine 50 configures the metric component 74 to perform the one or more identified metric algorithms.

In step 122, the discovery engine 50 identifies a matching strategy algorithm to perform based on the matching strategy selection 68 and the resource budget 70 to provide an identified matching strategy algorithm. In various embodiments, in response to the resource budget 70 being "low," the identified matching strategy algorithm is a first predetermined matching strategy algorithm. For example, the first predetermined matching strategy algorithm is the greedy algorithm. In response to the resource budget 70 being "medium," the identified matching strategy algorithm is a second predetermined matching strategy algorithm, which typically takes a longer amount of time to execute than the first predetermined matching strategy. In some embodiments, the first predetermined matching strategy algorithm is the greedy algorithm, and the second predetermined matching strategy algorithm is the Hungarian stable marriage algorithm. If the Hungarian stable marriage algorithm is not available, then the greedy algorithm is used. However, the matching strategy algorithm is not meant to be limited to the greedy and Hungarian stable marriage algorithms, and other algorithms may be used. In response to the resource budget being set to "high" and the matching strategy selection 68 being explicitly specified, the identified matching strategy algorithm is the matching strategy algorithm specified in the matching strategy selection 68. In response to the resource budget being set to "high" and the matching strategy selection 68 not being explicitly specified, the identified matching strategy algorithm is the default matching strategy algorithm. In some embodiments, the resource budget 70 is not used.

In step 124, the discovery engine 50 configures the matching component 80 to perform the identified matching strategy algorithm (arrow 126).

In step 128, the discovery engine invokes the metric component 74 to perform the one or more identified metric algorithms to determine one or more measurements representing the strength of the relationship between the elements of the first and second structural descriptions in the common format as shown by arrow 130 to provide a first result. The first result comprises one or more tuples $\{s1, s2, n_1, n_2, \ldots, n_q)\}$, where s1 corresponds to an element in the first structural description of the first set, s2 corresponds to an element in the second structural description of the second set, and $n_1, n_2, \ldots, n_q$ correspond to the relationship measurements computed by the q identified metric algorithms. Step 128 proceeds via Continuator A to step 131 of FIG. 4B.

In FIG. 4B, in step 131, the identified metric algorithm(s) applies the naming custom 65 to the elements of its associated structural description. If no naming custom is specified, step 131 is not performed. In some embodiments, step 131 is omitted, for example, if no metric algorithm uses the specified naming custom. In an alternate embodiment, no naming custom parameter is used and step 131 is omitted.

In step 132, at least one of the identified metric algorithms invokes the sample manager 78 to provide data samples as shown by arrow 134, if any of the identified metric algorithms use sample data. In various embodiments, the sample manager 78 uses the preferred sampling size and rate of the sample data connection information to control the amount and rate of data sampling from the data source in the native format. The metric algorithm also provides a sample identifier which is used to identify the data samples to retrieve. The sample identifier is typically an expression used to reference elements in the common format, for example, an XPATH expression. The sample manager 78 may also invoke the model manager 72 (arrow 135) to translate a sample identifier to an expression used by the native format. For example, to retrieve samples of element "SAMPLE/ Employee/firstName," the model manager 72, that is, a particular transformer of the model manager 72, is invoked to translate this expression to a relational expression such as "SAMPLE.Employee.firstName;" and the sample manager 78 uses the relational expression to retrieve sample data from a relational database. In various embodiments, when the sample identifier is in the native format of the source database, the sample manager 78 does not invoke the model manager 72. The sample manager 78 uses the appropriate sample module to retrieve data samples based on the sample identifier. The sample manager 78 provides the samples to the metric component 74 (arrow 137). Step 132 is omitted when a metric algorithm does not use sample data.

In step 138, the metric component 74 processes a plurality of measurements from the first result in accordance with the measurement composition mode 67 to provide a second result. Alternately, if a single measurement is provided in each tuple, step 138 is omitted and the first result is the second result.

In step 139, the metric component 74 orders the second result to produce a raw result. In particular, the metric component 74 orders the tuples of the second result in accordance with the measurement(s) of the tuples to provide the raw result. The metric component orders the tuples in accordance with the values of the measurements of each tuple. For example, given two measurements as tuples $u=<x_1, x_2, x_3>$ and $v=<y_1, y_2, y_3>$, tuple u is determined to be less than tuple v if and only if one of the following holds: (1) $x_1<y_1$; or (2) $x_1=y_1$ and $x_2<y_2$; or (3) $x_1=y_1$ and $x_2=y_2$ and $x_3<y_3$. Thus the first measurement of each vector is used for comparison; if the first metric fails to provide any differentiation, the next measurement is used for comparison until a measurement provides differentiation or the last measurement is compared. In this way, the tuples are ordered in accordance with the values of their measurements.

Some metric algorithms produce measurements having a high precision. In some embodiments, for the measurements produced by these metric algorithms, a threshold value, e, is used such that a measurement having a value of u is determined to be greater than a measurement having a value of value of v if and only if $(u-v)>e$. This threshold value varies depending on the precision of a specific metric algorithm, and is published by the metric algorithm itself. The default value for the threshold e is zero. Typically metric algorithms provide a normalized value of a measurement between zero and one. In various embodiments, measurements are not normalized. In some embodiments, the threshold value is provided by the user with the metric selection parameter 66; otherwise, the threshold value defaults to zero.

In step 140, the metric component 74 provides the raw result to the discovery engine 50 as shown by arrow 141. For example, the raw result comprises one or more tuples $\{s1_j, s2_j, m_{1,j}, \ldots, m_{q,j}\}$. In step 142, the discovery engine 50 invokes the matching component 80 (arrow 144) to provide a balanced result 82 (arrow 144) based on the raw result in accordance with the identified matching algorithm.

In step 148, the discovery engine 50 invokes the model manager 72 as shown by arrow 150 to convert the elements of the balanced result 82 and the raw result from the common format to the native format if the native format is different from the common format. The converted balanced result 82 and raw result are provided to the discovery engine 50 (arrow 151).

In step 152, the discovery engine 50 provides the balanced result 82 and raw result in the native format to the caller of the discovery engine 50. In some embodiments, only the balanced result 82 is provided.

In another embodiment, a matching strategy is not applied to the raw result and the raw result is returned to the user. In this embodiment, step 142 is omitted, step 148 only converts the raw result and step 152 only provides the raw result. For example, in some embodiments, a user can look at the raw result and select a number of results to look at for each element.

In another alternate embodiment, the discovery engine invokes the metric component; the metric component identifies the one or more metric algorithms to perform based on the metric selection and resource budget (step 114); and the metric component configures itself to perform the identified metric algorithms (step 120).

In yet another alternate embodiment, the metric component receives the sample data connection information, metric selection, measurement composition mode and resource budget parameters. The metric component identifies one or more metric algorithms to perform based on the metric selection parameter and resource budget parameters (step 114, FIG. 4A). The metric component loads the identified metric algorithms, invokes each identified metric algorithm and composes the results, based on the measurement composition mode to provide the raw result.

In various embodiments, the metric component configures the sample manager to establish a connection to the data sources using the sample data connection information.

In another embodiment, the functionality of at least one or any combination of the model manager, metric component, sample manager and matching component is implemented as part of the discovery engine.

In various embodiments, the discovery API defines various interfaces. In some embodiments, as part of the discovery API, the model manager 72 defines an API which is to be implemented by the transformers 84 as follows:
getName
String getName( );
The getName method returns the name of the transformer.
createFrom
ModelMap createFrom(Eobject originalModel);
Parameter: originalModel—a structural description in a native format
The createFrom method transforms the structural description in the native format to a structural description in the common format. The createFrom method returns the structural description in the common format, as well as relationships between the structural description in the common format and the structural description in the native format.
addToTransform
Boolean addToTransform(EObject originalcomponent, ModelMap mapping);
Parameters: originalcomponent—is a portion of a structural description
mapping—an existing structural description in the common format.
The addToTransform method returns an indicator of whether the portion of the structural description was successfully added to the existing structural description in the common format. The addToTransform method allows portions of a model to be added incrementally.
removeFromTransform
Boolean removeFromTransform (EObject originalcomponent, ModelMap mapping) throws ModelManagerException;
Parameters: originalComponent—the portion of the structural description to remove.
mapping—an existing structural description in the common format.
The removeFromTransform method returns an indicator of whether the portion of the structural description was successfully removed.

In various embodiments, as part of the discovery API, the sample manager 78 defines an API which is to be implemented by the sample modules 88 as follows:
getAgentName
public void getAgentName( );
The getAgentName method returns the name of the sampling agent, that is, the sample module.
setServerParameter
public void setServerParameter(ServerParameterSet serverparm) throws Exception;
Parameter: serverParm—contains at least a portion, and in some embodiments, all, the sample data connection information which was supplied as a parameter to the discovery engine.
The setServerParameter method provides the connection information to the server which contains the data to be sampled to the sampling module.
setCacheDB
public void setCacheDB (CacheDBConnection cacheDB);
Parameter: cacheDB—the location to store the samples.
The setCacheDB method is used to specify the location to store the samples.
getDataSample
public void getDataSample(RDBPathExpression attr, double rate, int maxRows);
Parameters: attr—a relational data expression to specify an element to sample, for example, myDB.Schema1.Table1.Column2.
rate—the specified sampling rate from the sample data connection information.
maxRows—a number of rows to sample based on the sample data connection information and the metric algorithm.
The getDataSample method collects samples based on the relational expression, the sampling rate (rate) and specified number of rows to sample (maxRows). The samples are stored at the location specified by the setCacheDB method.
getRowCount
public int getRowCount(RDBExpression attr) throws Exception;
Parameter: attr—specifies an element.
The getRowCount method returns the total number of rows which have the specified element in the data source.
releaseAllSamples
public void releaseAllSamples( ) throws Exception;
The releaseAllSamples method removes all cached samples and closes all connections to the data sources.

In various embodiments, as part of the discovery API, the metric component 74 defines an API which is to be implemented by all metric algorithms 86. In some embodiments, the metric algorithms provide their measurements in a predefined format defined by a class. In various embodiments, the portion of the discovery API defined by the metric component 74 comprises the following software methods:
configure
public void configure (SingleMetricConfig s)
Parameter: s—contains configuration information for a specific metric algorithm.
The configure method configures the metric component, for example, with a naming custom if the metric algorithm uses a naming custom.
match
public DiscoveredMapping[ ] match(
XSDElementLocator[ ] src1List,
XSDElementLocator[ ] src2List,
SampleManager sampleManager,
IndexedNamingStandard enterpriseDictionaries)
Parameters:
src1List—list of XSD objects. An XSD object comprises the structural description of the elements in the common format.
src2List—list of XSD objects.
enterpriseDictionaries—for each given element, from the structural descriptions src1List and src2List, enterpriseDictionaries determines the applicable expansion for each element, that is, an expansion of the element in accordance with the naming custom.
The match method invokes the metric algorithm which was configured to measure the distances between the elements from the different sets. The match method returns an array of measurements and, in some embodiments, information about the metric algorithm used to produce the measurements. In some embodiments, the array comprises tuples as described above which in some embodiments is the first result of step 128 of FIG. 4A. In an alternate embodiment, the enterpriseDictionaries parameter is omitted.
In various embodiments, additional exemplary software methods relating to the metric component of the discovery API comprise:
usesData
public boolean usesData( )
The usesData method returns an indication of whether this metric algorithm uses data. The usesData method is used by the caller to determine whether the sample manager is to be configured for the elements being compared.
preferredLeafSampleSize
public int preferredLeafSampleSize( )
The preferred LeafSampleSize method returns a value representing a preferred sample size in a number of leaf element instances; and returns zero if the metric algorithm does not use data.
preferredLeafSampleRate
public int preferredLeafSampleRate( )
The preferred LeafSampleRate method returns a value representing a preferred sample rate percentage; for example, 40 means rate of 40%. Returns zero if the metric algorithm does not use sample data.
The metric component's plug-in interface allows the discovery engine to select, combine and deploy a variety of metric algorithms over sets of elements. In various embodiments, at least one or any combination of the following metric algorithms are provided:
a basic Longest Common Substring (LCS) metric algorithm which provides a measurement representing the distance between two elements as the normalized edit distance between the element names;
a semantic name matching metric algorithm which uses a thesaurus and several string manipulation algorithms (segmentation and expansion) to provide a measurement representing the strength of the relationship between two metadata elements;

a signature metric algorithm which uses the signature and Naïve Bayes Classification to provide a measurement representing the distance between two elements using sample data; and an XRAM metric algorithm which uses distribution analysis to provide a measurement representing the distance between two elements using sample data.

The matching component 80 manages the matching strategy algorithm to be used as part of the discovery process. In various embodiments, only one matching strategy algorithm is invoked per invocation of the discovery engine, and the matching strategy selection parameter indicates a preferred matching strategy algorithm. Examples of matching strategy algorithms comprise stable marriage (Hungarian) and greedy matching. A matching strategy algorithm plug-in prescribes a standard interface that all matching strategy algorithm plug-ins implement.

In various embodiments, as part of the discovery API, the matching component 80 defines at least one API which is to be implemented by the matching strategy algorithms 90 as follows:

solve
public Discovered Mapping[ ]solve(Discoveredmapping[ ]matches)
  Parameter: matches—the raw result described above.
  The solve method returns a balanced result.

In various embodiments, two factors affect the outcome of the matching strategy process. One factor is an algorithm that sorts or orders the tuples of the result in order of strength to produce the raw result. This complete ordering is the basis for any notion of optimality. Serial composition is an example of a complete ordering.

Another factor is the criteria used by the matching strategy algorithm to produce an optimal subset of matches from the raw result. An example is a greedy algorithm which selects a subset of matches based on the greedy criteria until all elements are matched. In another example, "stable marriage" can be achieved by a classic Hungarian algorithm. In various embodiments, some criteria derived from maximum flow in a bipartite graph are also used; for example, algorithms exist in network optimization to compute such matches. In general, more sophisticated matching algorithms resolve conflicts more scientifically. For example, consider the following set of matches: <a, x, 0.1>, <a, y, 0.1>, <b, x, 0.1>, <b, y, 0.8>. Using the greedy algorithm, the tuples <a, x, 0.1> and <b, y, 0.8> are selected. Using a Hungarian stable marriage algorithm, a better set of tuples <a, y, 0.1>, <b, x, 0.1> are selected.

Figure 5:
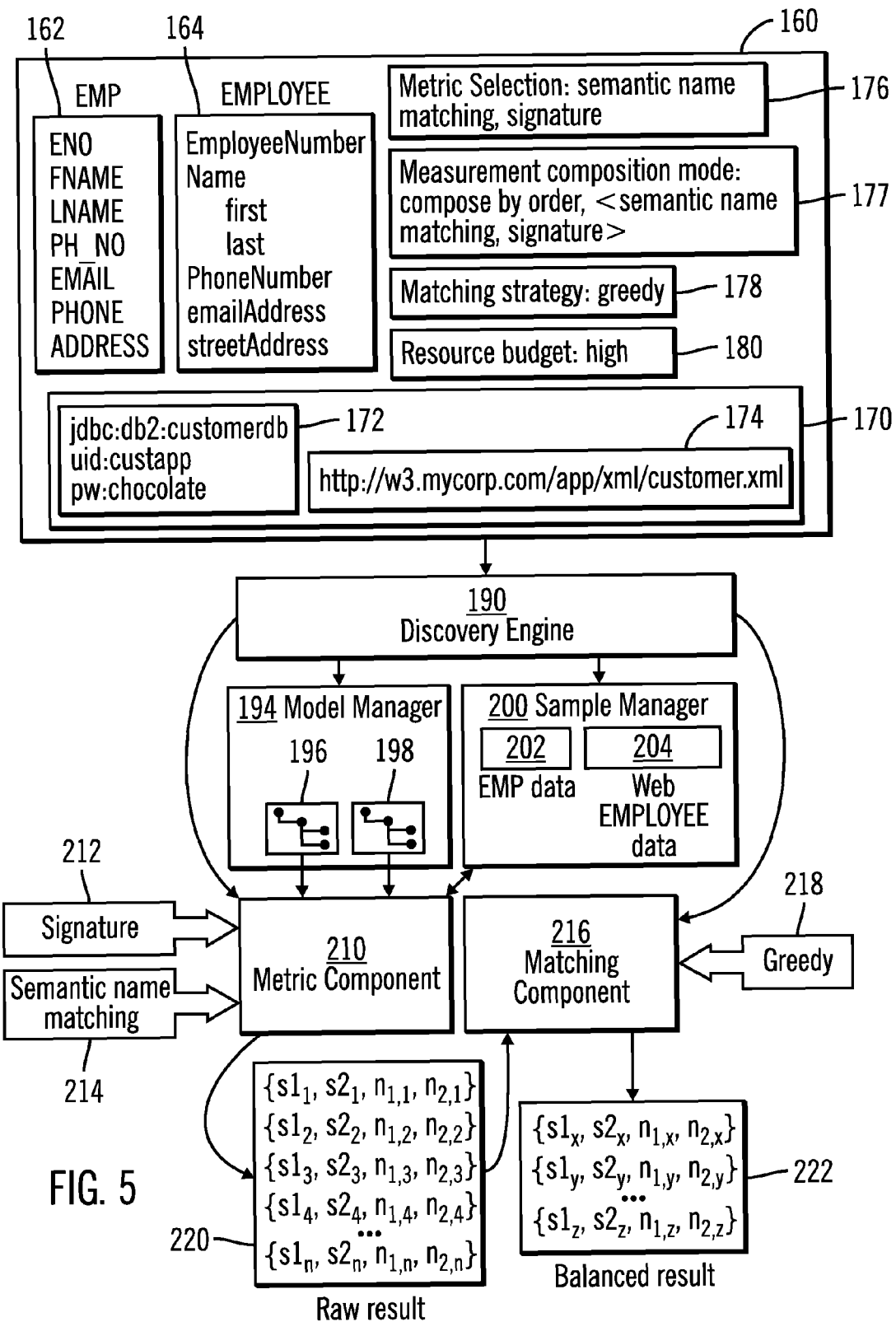
FIG. 5 depicts an example of an embodiment of an application of the framework for performing discovery of FIG. 2.

FIG. 5 depicts an example of an embodiment of an application of the framework for performing discovery. User-specified parameters 160 are supplied to the discovery engine 190 (step 182 of FIG. 4A). The parameters 160 comprise a structural description of a table named "EMP" 162 which uses the relational format, illustrated above in Table 1, and a table named "EMPLOYEE" 164 which uses the XSD model, which is also illustrated above. Block 162 and block 164 depict metadata which will be compared for the EMP and EMPLOYEE tables, respectively. The sample data connection information 170 comprises information 172 to access the table named "EMP" of a relational database. The information 172 to access the table named "EMP" comprises a name of the relational database called "jdbc:db2:customerdb", a user identifier (uid) called "custapp", and a password (pw) of "chocolate." The sample data connection information 170 also comprises information 174, that is, a URI, to access the table named "EMPLOYEE" which is in a web page. The metric selection parameter 176 specifies the semantic name matching and signature algorithms. The signature metric uses sample data. The measurement composition mode 177 specifies "compose by order" such that the first measurement is from the semantic name matching algorithm and the second measurement is from the signature algorithm. The matching strategy parameter 178 specifies the greedy algorithm. The resource budget parameter 180 is "high". A resource budget of "high" indicates that there is no constraint on the amount of time to spend on discovery. No naming custom parameter is specified.

Because the metric selection, measurement composition mode, matching strategy selection and resource budget parameters are specified, the discovery engine 190 does not set default values for those parameters (step 104, FIG. 4A).

The discovery engine 190 is invoked for the structural description of the two sets of elements, that is, the column names of the EMP and EMPLOYEE tables. The structural description of the first set of elements contains the names of the columns of the relational table illustrated by block 162, called EMP, which contains employee information as illustrated in Table 1. The structural description of the second set of elements contains the names of the columns of an XML document which contains the names of the columns of a table illustrated by block 164, called EMPLOYEE, which also contains employee information.

The discovery engine 190 invokes the model manager 194 to translate the structural descriptions of the EMP and EMPLOYEE tables to the common format (step 106, FIG. 4A), and receives the structural description 196 and 198 of each table in the common format (step 100, FIG. 4A). In this example, the model manager 194 translates the definition of the relational EMP table of Table 1 to an XSD model, and leaves the XSD model of the Employee table intact. Throughout the session, the model manager 194 maintains sufficient state information to translate between the original relational schema for EMP and the derived XSD model for EMP. The translated definition of the EMP table of Table 1 to the XSD model appears as follows:

```
<element name="EMP" maxOccurs="unbounded">
    <complexType>
        <sequence>
            <element name="ENO" type="integer"/>
            <element name="FNAME" type="string"/>
            <element name="LNAME" type="string"/>
            <element name="PH_NO" type="string"/>
            <element name="EMAIL" type="string"/>
            <element name="PHONE" type="string"/>
            <element name="ADDRESS" type="string"/>
        </sequence>
    </complexType>
</element>
```

The discovery engine 190 identifies the metric algorithms to perform based on the metric selection 166 and the resource budget 170 (step 114, FIG. 4A). In this example, because the resource budget 170 is set to "high," there is no limit on the amount of time to perform discovery and the user-specified metric algorithms will be performed.

The discovery engine 190 invokes the sample manager 200 to establish a connection to the data sources, the EMP and EMPLOYEE tables, 202 and 204, respectively, using the sample data connection information 170 and 172 (step 116, FIG. 4A).

The discovery engine 190 configures the metric component 210 to perform the semantic name matching and signature algorithms, 214 and 212, respectively (step 120, FIG. 4A). The metric component 210 sets up any state information for the metric algorithms. Because the signature algorithm uses sample data, a reference to the sample manager 200 is established for the signature algorithm.

The discovery engine 190 identifies a matching strategy algorithm to perform based on the specified matching strategy and the resource budget to provide an identified matching strategy. In this example, because the resource budget is high, the user-specified greedy algorithm of the matching strategy selection parameter 168 will be performed (step 122, FIG. 4A).

The discovery engine 190 configures the matching component 216 to perform the greedy algorithm 218 (step 124, FIG. 4A).

The discovery engine 190 invokes the metric component 210 to perform the semantic name matching and signature algorithms, 214 and 212, respectively, to determine the strength of a relationship between the elements of different sets based on the structural description of the sets in the common format (step 128, FIG. 4A). The signature algorithm invokes the sample manager 200 to retrieve sample data from the EMP and the EMPLOYEE tables (step 132, FIG. 4B). In various embodiments, the sample manager 200 provides data samples which are identified using XPath, while the actual data samples are extracted from data sources using a source-specific expression. The sample manager 200 invokes the model manager 194 to translate an XPath expression requested by the metric algorithm to the source-specific expression as described in the section "Model Manager". The sample manager 200 then extracts a sampling identified by the source-specific identifier. For example, the signature algorithm may request a sample of the "PH_NO" column of the relational table using the XPath expression "myschema/emp/ph_no" of the sample manager. The sample manager 200 invokes the model manager 194 to translate the XPath expression to a request to retrieve the PH_NO column from the table myschema.emp. The sample manager 200 takes a sample of the PH_NO column from the myschema.emp table in the database customerdb.

The metric component 210 performs the semantic name matching algorithm 214 which does not use sample data, and the signature algorithm with the sample data and provides first raw result (Steps 128 and 132, of FIGS. 4A and 4B, respectively). Step 131 of FIG. 4B is omitted because no naming custom parameter was specified. Each metric algorithm produces a {EMP, EMPLOYEE, distance measure} tuple for each combination of elements in EMP and EMPLOYEE and the metric component places the measurements of each metric algorithm into a tuple. The metric component 210 processes the measurements of the first result in accordance with the measurement composition mode 177 such that the semantic name matching measurement precedes the signature measurement with each tuple (step 138, FIG. 4B) to provide a second result. The metric component 210 orders the tuples of the second result to produce a raw result 220 (step 139, FIG. 4B). The metric component 210 provides the raw result 220 to the discovery engine 190 (step 140, FIG. 4B).

The discovery engine 190 receives the raw result 220 and invokes the matching component 216 to apply the greedy algorithm to the raw result 220 to provide a balanced result 222 (step 142, FIG. 4B). The discovery engine 190 invokes the model manager 194 to convert the element names of the balanced result and the raw result from the common format to the native format (step 148, FIG. 4B), if the native format is different from the common format. The discovery engine 190 provides the balanced result and the raw result in the native format (step 152, FIG. 4B).

FIG. 6 depicts the exemplary raw result 220 produced by the example of FIG. 5. Measurements are computed for all combinations of the elements from each table; however, FIG. 6 shows a portion of those combinations. The full size of the raw result 220 is forty-two because the EMP table has seven elements and the EMPLOYEE table has six elements. The first column 232 contains element names from the EMP table and the second column 234 contains element names from the EMPLOYEE table. The semantic name matching measurement is produced by the semantic name matching algorithm. The signature measurement is produced by the signature algorithm. The numbers in columns 236 and 238 are the measurements computed by the semantic name matching and signature algorithms for the combination of {EMP, EMPLOYEE} elements of the row. The closer a value of the measurement is to zero, the stronger the relationship between the associated elements. The values of the measurements are not comparable across metric algorithms. For example, the semantic name matching algorithm computed a strength of 0.3 for the combination of {FNAME, Name/First}, while the signature algorithm computed a strength of 0.57 for those same elements. Although 0.3<0.57, 0.57 is actually a very strong measurement, relative to other numbers produced by the signature algorithm. The measurements are typically normalized.

The matching strategy is invoked to reduce the raw result 220 to the balanced result 222. In the example of FIG. 5, the greedy algorithm is used to select a match for each element until each element has a match. For example, the tuples of the raw result 220 are ordered. In this example, starting from the beginning of the raw result 220, the greedy algorithm selects the first match it encounters for each pair of elements having elements which have not already been selected, until all elements have a match.

Figure 7:
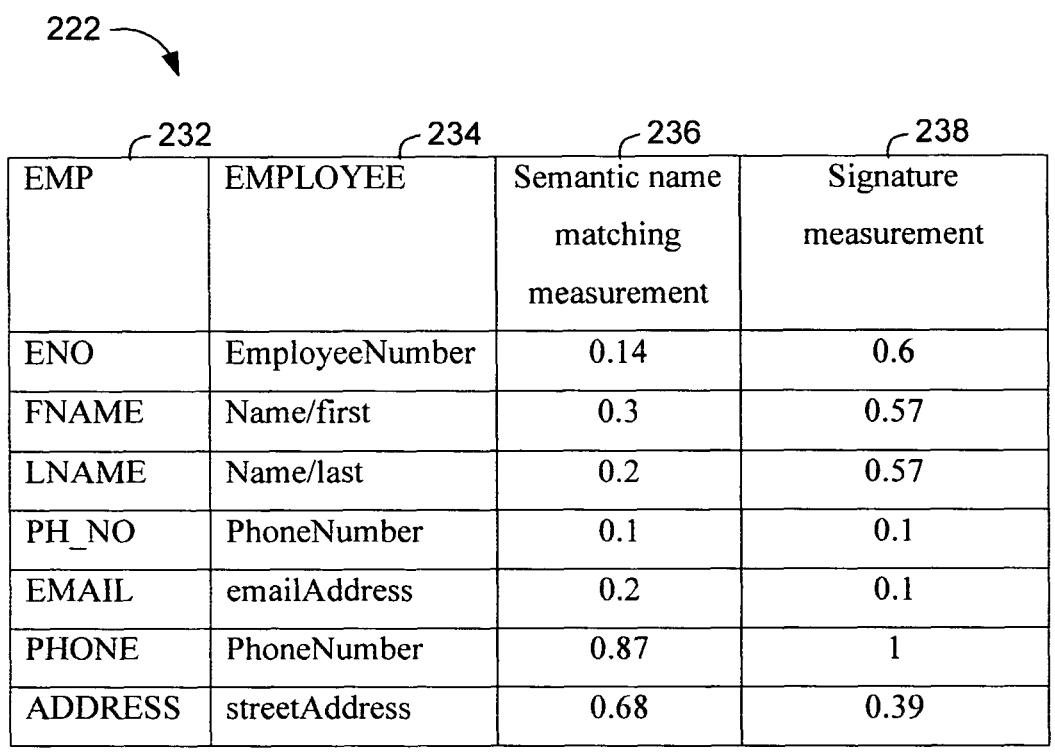
FIG. 7 depicts an exemplary balanced result which is a subset of the raw result of FIG. 6.

FIG. 7 depicts the balanced result 222 which is a subset of the raw result 220 of FIG. 6. The first column 232 has an element name from the EMP table and the second column 234 contains an element name from the EMPLOYEE table. The semantic name matching measurement 236 is produced by the semantic name matching algorithm. The signature measurement 238 is produced by the signature algorithm. In this example, the element pair <EmployeeNumber, ENO> is a better match than <PhoneNumber, ENO>, since both the semantic name matching algorithm and the signature algorithm assigned lower scores for <EmployeeNumber, ENO>. In another example, <streetAddress, ADDRESS> is a better match than <emailAddress, ADDRESS>. In this case, the semantic name matching algorithm assigned a measurement of 0.68 to both <streetAddress, ADDRESS> and <emailAddress, ADDRESS>. However, the signature algorithm was able to assign a stronger relationship between <streetAddress, ADDRESS> (0.39) than <emailAddress, ADDRESS> (0.90). In both of these cases, the combination of both algorithms produces a stronger result than either metric algorithm separately. The balanced result is returned to the caller in the native format.

Figure 8:
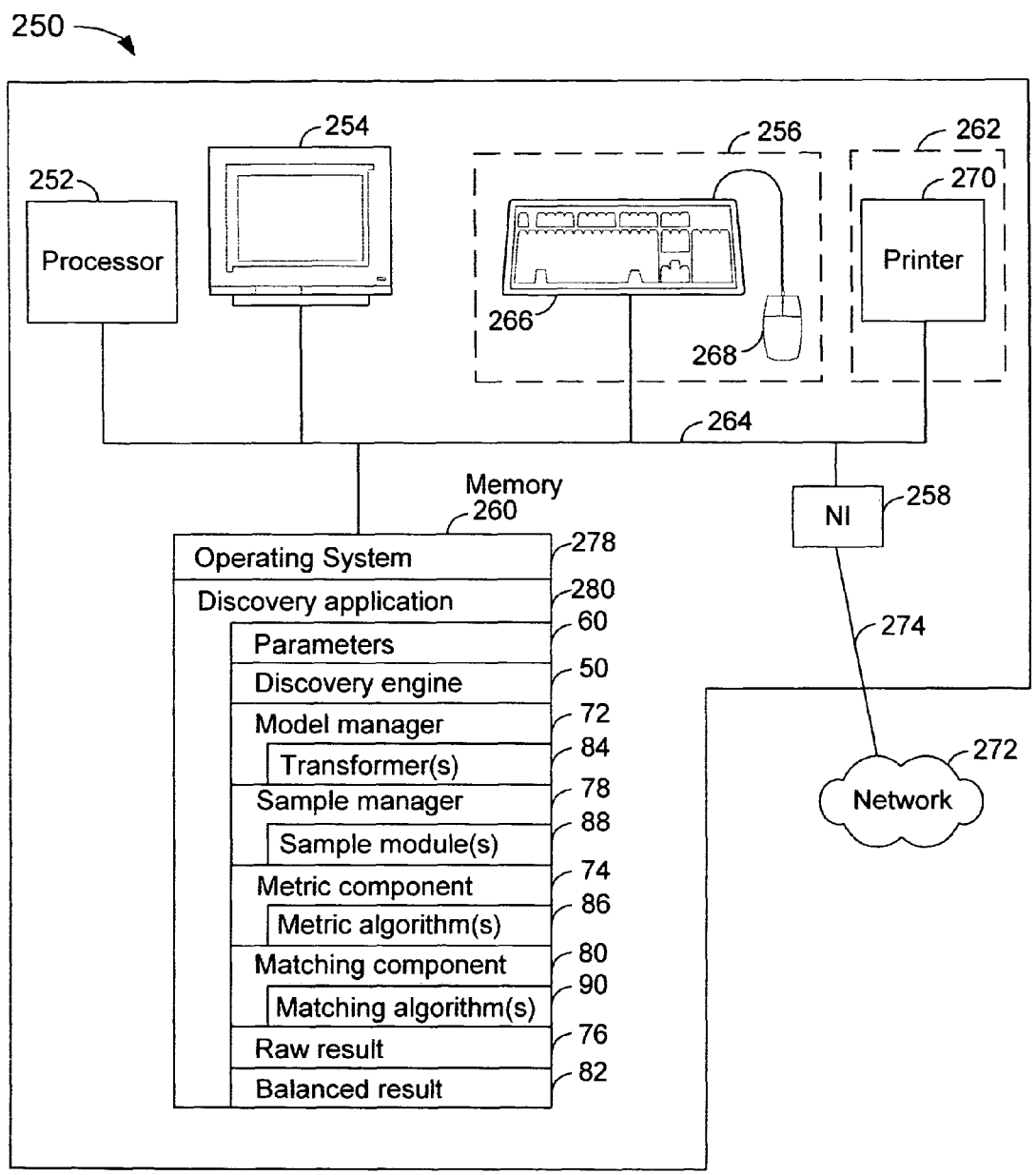
FIG. 8 depicts an illustrative computer system which uses various embodiments of the present invention.

FIG. 8 depicts an illustrative computer system 250 which uses various embodiments of the present invention. The computer system 250 comprises a processor 252, display 254, input interfaces (I/F) 256, communications interface 258, memory 260 and output interface(s) 262, all conventionally coupled by one or more buses 264. The input interfaces 256 comprise a keyboard 266 and a mouse 268.

The output interface 262 comprises a printer 270. The communications interface 258 is a network interface (NI) that allows the computer 250 to communicate via a network 272, such as the Internet. The communications interface 258 may be coupled to a transmission medium 274 such as a network transmission line, for example twisted pair, coaxial cable or fiber optic cable. In another embodiment, the communications interface 258 provides a wireless interface, that is, the communications interface 258 uses a wireless transmission medium. In some embodiments, the network 272 is connected, via another transmission medium 276, to one or more data sources 278.

The memory 260 generally comprises different modalities, illustratively semiconductor memory, such as random access memory (RAM), and disk drives. In various embodiments, the memory 260 stores an operating system 278 and discovery application 280. In various embodiments, discovery application 280 comprises the parameters 60, a discovery engine 50, model manager 72 with transformer(s) 84, sample manager 78 with sample module(s) 88, metric component 74 with metric algorithm(s) 86 and a matching component 80 with matching strategy algorithm(s) 90. When executed, the discovery application 280 also produces raw result 76 and balanced result 82.

In various embodiments, the specific software instructions, data structures and data that implement various embodiments of the present invention are typically incorporated in the discovery application 180. Generally, an embodiment of the present invention is tangibly embodied in a computer-readable medium, for example, the memory 260 and is comprised of instructions which, when executed by the processor 252, causes the computer system 250 to utilize the present invention. The memory 260 may store the software instructions, data structures and data for any of the operating system 178 and the discovery application 180, in semiconductor memory, in disk memory, or a combination thereof. Other computer memory devices presently known or that become known in the future, or combination thereof, may be used for memory 260.

The operating system 178 may be implemented by any conventional operating system such as z/OS® (Registered Trademark of International Business Machines Corporation), MVS® (Registered Trademark of International Business Machines Corporation), OS/390® (Registered Trademark of International Business Machines Corporation), AIX® (Registered Trademark of International Business Machines Corporation), UNIX® (UNIX is a registered trademark of the Open Group in the United States and other countries), WINDOWS® (Registered Trademark of Microsoft Corporation), LINUX® (Registered trademark of Linus Torvalds), Solaris® (Registered trademark of Sun Microsystems Inc.) and HP-UX® (Registered trademark of Hewlett-Packard Development Company, L.P.).

In various embodiments, the present invention may be implemented as a method, system, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier or media. In addition, the software in which various embodiments are implemented may be accessible through the transmission medium, for example, from a server over the network. The article of manufacture in which the code is implemented also encompasses transmission media, such as the network transmission line and wireless transmission media. Thus the article of manufacture also comprises the medium in which the code is embedded. Those skilled in the art will recognize that many modifications may be made to this configuration without departing from the scope of the present invention.

The exemplary computer system illustrated in FIG. 8 is not intended to limit the present invention. Other alternative hardware environments may be used without departing from the scope of the present invention.

Various embodiments of the invention have been described with respect to determining the difference between elements. Alternately, some embodiments may be used to determine a similarity between elements rather than the difference.

In addition, various embodiments have been described with respect a discovery framework comprising the discovery engine, model manager, sample manager, metric component and matching component. In another embodiment, the discovery framework comprises the discovery engine and metric component, and the sample data connection information and matching strategy selection parameters are omitted. In yet another embodiment, the discovery framework comprises the discovery engine, metric component and model manager, and the sample data connection information and matching strategy selection parameters are omitted. Alternately, the discovery framework comprises the discovery engine, metric component and sample manager, and the matching strategy parameter is omitted. In another alternate embodiment, the discovery framework comprises the discovery engine, metric component and matching component, and the sample data connection information parameter is omitted. In yet another alternate embodiment, the discovery engine comprises the discovery engine, metric component and at least one or any combination of the model manager, sample manager and matching component.

The foregoing detailed description of various embodiments of the invention has been presented for the purposes of illustration and description, including the pseudo code and description examples herein. It is not intended to be exhaustive or to limit the invention to the precise form disclosed. Many modifications and variations are possible in light of the above teachings. It is intended that the scope of the invention be limited not by this detailed description, but rather by the claims appended thereto.

What is claimed is:

1. A computer-implemented method of discovering relationships among a first set of elements with respect to a first data source and a second set of elements with respect to a second data source, comprising:

applying a plurality of metric algorithms to a first structural description of the first set of elements and a second structural description of the second set of elements, wherein the first structural description describes a first structure of data in the first data source and the second structural description describes a second structure of data in the second data source, wherein each of the metric algorithms produces a metric result for each pair of elements in the first and the second sets, wherein each of the metric results for each pair of elements comprises a relationship strength value between the pair of elements in the first and second sets, wherein each of the relationship strength values produced using one of the metric algorithms for each pair of elements indicates a strength of a relationship between the pair of elements in the first and second sets that has a well defined meaning when compared with other relationship strength values;

producing raw results that include for each pair of first elements in the first and second sets the relationship strength values produced using the metric algorithms;

determining, for each element from the first set, a balanced result comprising a selected pair of pairs including the element from the first set and a determined element of the elements from the second set that has highest of the relationship strength values from the metric algorithms of the pairs with the element from the first set to produce a balanced result set that are a subset of the raw results, wherein pairs including each element from the first set with elements in the second set other than the determined element in the second set forming the balanced result set are excluded from the balanced results; and returning the balanced result set.

2. The method of claim 1, wherein the relationship strength value indicates one of a measurement value comprising distance between the pair of elements of the first and second sets, a similarity between the pair of elements of the first and second sets, and a distance between the pair of elements of the first and second sets determined by a distribution analysis.

3. The method of claim 1, wherein the metric algorithms use sample data from the first and second data sources to determine the relationship strength value between the pairs of elements in the first and second sets.

4. The method of claim 1, wherein the first structural description describes the first structure in a first native format used by the first data source and wherein the second structural description describes the second structure in a second native format used by the second data source, further comprising:

translating the first and second structural descriptions from the first and second native formats, respectively, to common formats comprising a first common format structural description and a second common format structural description, wherein the metric algorithms are applied to the first and second common format structural descriptions to produce the metric result.

5. The method of claim 4, further comprising:
converting the elements of the first and second sets in the balanced result set from the common formats to the first and second native formats, respectively.

6. The method of claim 1, wherein applying the metric algorithms further comprises:

providing a naming custom parameter that provides for each specified named element in the first and second structural descriptions a mapping of the specified named elements in the first and second structural descriptions to mapped name components; and replacing specified named elements in the first and second structural descriptions with the mapped named components in the naming custom parameter.

7. The method of claim 1, further comprising:
receiving indication of a resource budget representing an amount of time to apply the metric algorithms and a matching strategy algorithm to determine the balanced result set; and selecting the metric algorithms and the matching strategy algorithm from a plurality of metric algorithms and matching strategy algorithms to use that will determine the relationships of elements that satisfy constraints of the resource budget, wherein the selected metric algorithms and the selected matching strategy algorithm comprise the applied metric algorithms and the applied matching strategy algorithm.

8. The method of claim 7, wherein each of the plurality of metric algorithms and matching strategy algorithms are associated with a resource budget value, and wherein selecting the metric algorithms and the matching strategy algorithm comprises selecting one of the metric algorithms and one of the matching strategy algorithms having resource budget values satisfying a resource budget value of the received resource budget.

9. The method of claim 1, wherein the relationship strength values comprise a first result set of relationship strength values, further comprising:

processing the metric results having relationship strength values from the metric algorithms for the pairs of elements in the first and second sets to produce a composite metric result comprising relationship strength values for the pairs of elements in the first and second sets, wherein a matching strategy algorithm processes the composite metric result of relationship strength values for the pairs of elements in the first and second sets to determine element pairs of the first and second sets that represent optimal matches according to a matching criteria.

10. The method of claim 9, wherein the composite metric result for each element pair comprises one of:

an ordering of the relationship strength values for the element pair and a single measurement resulting from an operation on weighted relationship strength values from the metric algorithms.

11. The method of claim 1, wherein the first and second sets of elements comprise metadata describing the first and second data sources, respectively, and wherein the relationship strength values describe a strength of the relationship between pairs of metadata elements of the first and second data sources.

12. The method of claim 1, wherein applying the metric algorithms comprise applying a plurality of m metric algorithms to produce a metric result comprising multiple tuples $\{S1_i, S2_i, n_{1,i} \ldots n_{m,i}\}$, where $S1_i$ and $S2_i$ represent elements from the first and second sets of elements and $n_{1,i} \ldots n_{m,i}$ are the relationship measurements of elements $S1_i$ and $S2_i$ determined by the m metric algorithms.

13. An article of manufacture comprising a computer usable storage medium embodying instructions executable by a computer for discovering relationships among a first set of elements with respect to a first data source and a second set of elements with respect to a second data source, wherein the instructions cause operations comprising:

applying a plurality of metric algorithms to a first structural description of the first set of elements and a second structural description of the second set of elements, wherein the first structural description describes a first structure of data in the first data source and the second structural description describes a second structure of data in the second data source, wherein each of the metric algorithms produces a metric result for each pair of elements in the first and the second sets, wherein each of the metric results for each pair of elements comprises a relationship strength value between the pair of elements in the first and second sets, wherein each of the relationship strength values produced using one of the metric algorithms for each pair of elements indicates a strength of a relationship between the pair of elements in the first and second sets that has a well defined meaning when compared with other relationship strength values;

producing raw results that include for each pair of first elements in the first and second sets the relationship strength values produced using the metric algorithms;

determining, for each element from the first set, a balanced result comprising a selected pair of pairs including the element from the first set and a determined element of the elements from the second set that has highest of the relationship strength values from the metric algorithms of the pairs with the element from the first set to produce a balanced result set that are a subset of the raw results, wherein pairs including each element from the first set with elements in the second set other than the determined element in the second set forming the balanced result set are excluded from the balanced results; and returning the balanced result set.

14. The article of manufacture of claim 13, wherein the relationship strength value indicates one of a measurement value comprising distance between the pair of elements of the first and second sets, a similarity between the pair of elements of the first and second sets, and a distance between the pair of elements of the first and second sets determined by a distribution analysis.

15. The article of manufacture of claim 13, wherein the metric algorithms use sample data from the first and second data sources to determine the relationship strength value between the pairs of elements in the first and second sets.

16. The article of manufacture of claim 13, wherein the first structural description describes the first structure in a first native format used by the first data source and wherein the second structural description describes the second structure in a second native format used by the second data source, further comprising:

translating the first and second structural descriptions from the first and second native formats, respectively, to common formats comprising a first common format structural description and a second common format structural description, wherein the metric algorithms are applied to the first and second common format structural descriptions to produce the metric result.

17. The article of manufacture of claim 16, wherein the operations further comprise:

converting the elements of the first and second sets in the balanced result set from the common formats to the first and second native formats, respectively.

18. The article of manufacture of claim 13, wherein applying the metric algorithms further comprises:

providing a naming custom parameter that provides for each specified named element in the first and second structural descriptions a mapping of the specified named elements in the first and second structural descriptions to mapped name components; and replacing specified named elements in the first and second structural descriptions with the mapped named components in the naming custom parameter.

19. The article of manufacture of claim 13, wherein the operations further comprise:

receiving indication of a resource budget representing an amount of time to apply the metric algorithms and a matching strategy algorithm to determine the balanced result set; and selecting the metric algorithms and the matching strategy algorithm from a plurality of metric algorithms and matching strategy algorithms to use that will determine the relationships of elements that satisfy constraints of the resource budget, wherein the selected metric algorithms and the selected matching strategy algorithm comprise the applied metric algorithms and the applied matching strategy algorithm.

20. The article of manufacture of claim 19, wherein each of the plurality of metric algorithms and matching strategy algorithms are associated with a resource budget value, and wherein selecting the metric algorithms and the matching strategy algorithm comprises selecting one of the metric algorithms and one of the matching strategy algorithms having resource budget values satisfying a resource budget value of the received resource budget.

21. The article of manufacture of claim 13, wherein the relationship strength values comprise a first result set of relationship strength values, wherein the operations further comprise:

processing the metric results having relationship strength values from the metric algorithms for the pairs of elements in the first and second sets to produce a composite metric result comprising relationship strength values for the pairs of elements in the first and second sets, wherein a matching strategy algorithm processes the composite metric result relationship strength values for the pairs of elements in the first and second set to determine element pairs of the first and second sets that represent optimal matches according to a matching criteria.

22. The article of manufacture of claim 21, wherein the composite metric result for each element pair comprises one of: an ordering of the relationship strength values for the element pair and a single measurement resulting from an operation on weighted relationship strength values from the metric algorithms.

23. The article of manufacture of claim 13, wherein the first and second sets of elements comprise metadata describing the first and second data sources, respectively, and wherein the relationship strength values describe a strength of the relationship between pairs of metadata elements of the first and second data sources.

24. A computer system for discovering relationships among a first set of elements with respect to a first data source and a second set of elements with respect to a second data source in at least storage system, comprising:

a processor;

a computer readable storage medium having program components executed to perform operations, the operations comprising:

applying a plurality of metric algorithms to a first structural description of the first set of elements and a second structural description of the second set of elements, wherein the first structural description describes a first structure of data in the first data source and the second structural description describes a second structure of data in the second data source, wherein each of the metric algorithms produces a metric result for each pair of elements in the first and the second sets, wherein each of the metric results for each pair of elements comprises a relationship strength value between the pair of elements in the first and second sets, wherein each of the relationship strength values produced using one of the metric algorithms for each pair of elements indicates a strength of a relationship between the pair of elements in the first and second sets that has a well defined meaning when compared with other relationship strength values;

producing raw results that include for each pair of first elements in the first and second sets the relationship strength values produced using the metric algorithms;

determining, for each element from the first set, a balanced result comprising a selected pair of pairs including the element from the first set and a determined element of the elements from the second set that has a highest of the relationship strength values from the metric algorithms of the pairs with the element from the first set to produce a balanced result set that are a subset of the raw results, wherein pairs including each element from the first set with elements in the second set other than the determined element in the second set forming the balanced result set are excluded from the balanced results; and returning the balanced result set.

25. The computer system of claim 24, wherein the relationship strength value indicates one of a measurement value comprising distance between the pair of elements of the first and second sets, a similarity between the pair of elements of the first and second sets, and a distance between the pair of elements of the first and second sets determined by a distribution analysis.

26. The computer system of claim 24, wherein the metric algorithms use sample data from the first and second data sources to determine the relationship strength value between the pairs of elements in the first and second sets.

27. The computer system of claim 24, wherein the first structural description describes the first structure in a first native format used by the first data source and wherein the second structural description describes the second structure in a second native format used by the second data source, wherein the operations further comprise:

translating the first and second structural descriptions from the first and second native formats, respectively, to common formats comprising a first common format structural description and a second common format structural description, wherein the metric algorithms are applied to the first and second common format structural descriptions to produce the metric result.

28. The computer system of claim 27, wherein the operations further comprise:

converting the elements of the first and second sets in the balanced result set from the common formats to the first and second native formats, respectively.

29. The computer system of claim 24, wherein applying the metric algorithms further comprises:

providing a naming custom parameter that provides for each specified named element in the first and second structural descriptions a mapping of the specified named elements in the first and second structural descriptions to mapped name components; and replacing specified named elements in the first and second structural descriptions with the mapped named components in the naming custom parameter.

30. The computer system of claim 24, wherein the operations further comprise:

receiving indication of a resource budget representing an amount of time to apply the metric algorithms and a matching strategy algorithm to determine the balanced result set; and selecting the metric algorithms and the matching strategy algorithm from a plurality of metric algorithms and matching strategy algorithms to use that will determine the relationships of elements that satisfy constraints of the resource budget, wherein the selected metric algorithm and the selected matching strategy algorithm comprise the applied metric algorithm and the applied matching strategy algorithm.

31. The computer system of claim 30, wherein each of the plurality of metric algorithms and matching strategy algorithms are associated with a resource budget value, and wherein selecting the metric algorithms and the matching strategy algorithm comprises selecting one of the metric algorithms and one of the matching strategy algorithms having resource budget values satisfying a resource budget value of the received resource budget.

32. The computer system of claim 24, wherein the relationship strength values comprise a first result set of relationship strength values, wherein the operations further comprise:

processing the metric results having relationship strength values from the metric algorithms for the pairs of elements in the first and second sets to produce a composite metric result comprising relationship strength values for the pairs of elements in the first and second sets, wherein a matching strategy algorithm processes the composite metric result relationship strength values for the pairs of elements in the first and second set to determine element pairs of the first and second sets that represent optimal matches according to a matching criteria.

33. The computer system of claim 32, wherein the relationship strength value in the composite metric result for each element pair comprises one of:

an ordering of the relationship strength values for the element pair and a single measurement resulting from an operation on weighted relationship strength values from the metric algorithms.

34. The computer system of claim 24, wherein the first and second sets of elements comprise metadata describing the first and second data sources, respectively, and wherein the relationship strength values describe a strength of the relationship between pairs of metadata elements of the first and second data sources.

* * * * *